(12) United States Patent
Nakao et al.

(10) Patent No.: US 9,009,342 B2
(45) Date of Patent: *Apr. 14, 2015

(54) NETWORK RELAY APPARATUS

(75) Inventors: Yoshihiro Nakao, Yokohama (JP);
Shinichi Akahane, Hachioji (JP);
Masayuki Shinohara, Kawasaki (JP);
Atsushi Serizawa, Minamiashigara (JP)

(73) Assignee: ALAXALA Networks Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/587,039

(22) Filed: Aug. 16, 2012

(65) Prior Publication Data

US 2012/0311169 A1 Dec. 6, 2012

Related U.S. Application Data

(63) Continuation of application No. 13/005,672, filed on Jan. 13, 2011, now Pat. No. 8,412,843, which is a continuation of application No. 12/197,584, filed on Aug. 25, 2008, now Pat. No. 7,904,582.

(30) Foreign Application Priority Data

Aug. 27, 2007 (JP) .................................. 2007-219184
Jun. 9, 2008 (JP) .................................. 2008-150056

(51) Int. Cl.
*G06F 15/16* (2006.01)
*H04L 12/10* (2006.01)
(Continued)

(52) U.S. Cl.
CPC ................ *H04L 12/10* (2013.01); *H04L 45/00* (2013.01); *H04L 45/586* (2013.01); *H04L 47/10* (2013.01); *H04L 47/125* (2013.01); *H04L 49/1553* (2013.01)

(58) Field of Classification Search
USPC .................... 709/201, 231, 238; 370/252, 392
See application file for complete search history.

(56) References Cited

U.S. PATENT DOCUMENTS 4,747,041 A * 5/1988 Engel et al. .................... 713/324
5,844,813 A * 12/1998 Tateyama ...................... 713/340
(Continued)

FOREIGN PATENT DOCUMENTS

JP      2003087296      3/2003
JP      2003069607      7/2003
(Continued)

OTHER PUBLICATIONS

FTOS Configuration Guide, Force 10 Networks, Chapter 12, pp. 219-234, Mar. 2006.

(Continued)

*Primary Examiner* — Phuoc Nguyen
(74) *Attorney, Agent, or Firm* — Brundidge & Stanger, P.C.

(57) ABSTRACT

A network relay apparatus which conducts data transfer by using a plurality of network LSIs includes a transfer engine unit having at least two network LSIs and a central control unit which controls the operation state of the network relay apparatus. The transfer engine unit includes the network LSIs capable of changing over at least one of a clock and an operation which differ every function block, a load judgment unit for judging a load laid upon each of function blocks in the network LSI, and a frequency voltage control unit for individually changing over at least one of the clock and operation voltage supplied to each function block on the basis of the load judged by the load judgment unit.

13 Claims, 12 Drawing Sheets

(51) Int. Cl.
*H04L 12/701* (2013.01)
*H04L 12/713* (2013.01)
*H04L 12/801* (2013.01)
*H04L 12/803* (2013.01)
*H04L 12/933* (2013.01)

(56) References Cited

U.S. PATENT DOCUMENTS

| | | | |
|---|---|---|---|
| 6,091,934 | A | 7/2000 | Berman et al. |
| 6,295,560 | B1 | 9/2001 | Kanno et al. |
| 6,560,233 | B1 * | 5/2003 | Hatanaka et al. ............. 370/401 |
| 6,792,337 | B2 | 9/2004 | Blackett et al. |
| 7,596,706 | B2 * | 9/2009 | Fuseya ......................... 713/300 |
| 7,904,582 | B2 | 3/2011 | Nakao et al. |
| 2002/0071443 | A1 | 6/2002 | Tsukamoto et al. |
| 2002/0123365 | A1 | 9/2002 | Thorson et al. |
| 2005/0177681 | A1 | 8/2005 | Fujimoto et al. |
| 2005/0276263 | A1 | 12/2005 | Suetsugu et al. |
| 2006/0029087 | A1 | 2/2006 | Ooi |
| 2006/0057967 | A1 | 3/2006 | Shimada |
| 2006/0159116 | A1 | 7/2006 | Gerszberg et al. |
| 2007/0053360 | A1 | 3/2007 | Hino et al. |
| 2008/0025225 | A1 | 1/2008 | Kanno |
| 2009/0063679 | A1 | 3/2009 | Nakao et al. |
| 2011/0107127 | A1 | 5/2011 | Nakao |

FOREIGN PATENT DOCUMENTS

| | | |
|---|---|---|
| JP | 2006052970 | 2/2006 |
| JP | 2006042013 | 9/2006 |
| JP | 2007074607 | 3/2007 |
| JP | 2007097126 | 4/2007 |
| JP | 2007228490 | 9/2007 |
| JP | 2007228491 | 9/2007 |

OTHER PUBLICATIONS

White Paper; Virtual Switch Redundancy Protocol (VSRP), Foundry Networks, Feb. 2002.

S. Shah, et al., RFC3619, Extreme Networks' Ethernet Automatic Protection Switching (EAPS), Oct. 2003.

S. Knight et al., RFC2338, Virtual Router Redundancy Protocol, Apr. 1998.

IEEE Standard for Information Technology—Telecommunications and information exchange between systems—Local and metropolitan area networks—Common specifications, Part 3: Media Access Control (MAC) Bridges, ANSI/IEEE Std 802.1D, 1998 Edition, Chapter 8, pp. 58-109, 1998.

Configuration Settings, vol. 2, Ver. 10.3 Compatible AX63S-S002-10, Alaxala Networks Corporation, Chapter 13, pp. 187-212, Nov. 2006.

* cited by examiner

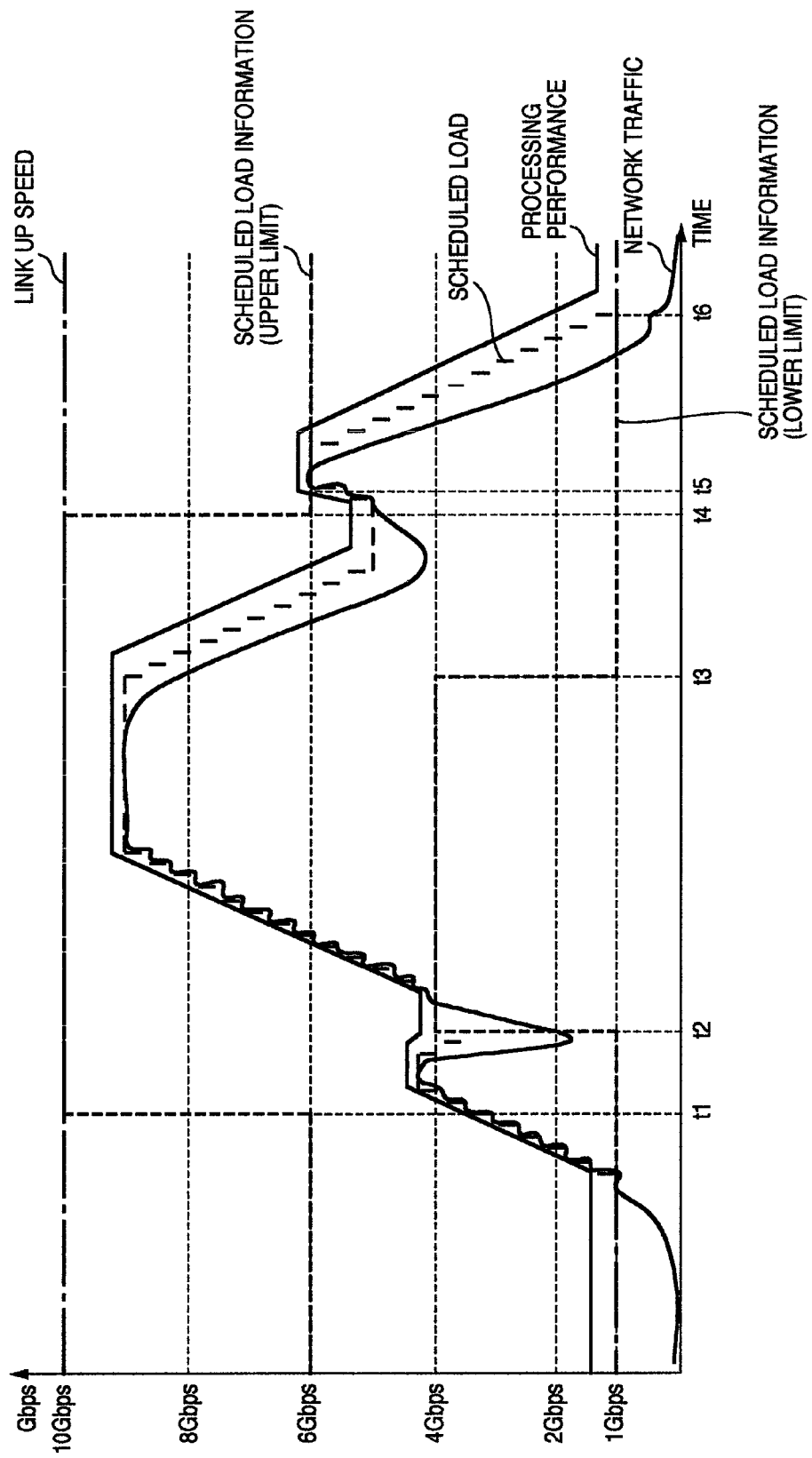

NETWORK RELAY APPARATUS

CROSS-REFERENCE TO RELATED APPLICATIONS

The present application is a continuation of application Ser. No. 13/005,672, filed Jan. 13, 2011, now U.S. Pat. No. 8,412,843; which is a continuation of application Ser. No. 12/197,584, filed Aug. 25, 2008, now U.S. Pat. No. 7,904,582; which claims priorities from Japanese applications JP2007-219184 filed on Aug. 27, 2007, and JP2008-150056 filed on Jun. 9, 2008, the contents of which are hereby incorporated by reference into this application.

BACKGROUND OF THE INVENTION

The present invention relates to a network relay apparatus for conducting data transfer, and in particular to a network relay apparatus which reduces power consumption.

In Internet service providers and basic networks of intra-enterprise networks, network relay apparatuses which transfer frames by using a plurality of network LSIs are becoming utilized. In such a network relay apparatus, all network LSIs have operated conventionally with a clock and an operation voltage which maximizes the performance regardless of whether the network traffic is large or small. Even if the data transfer quantity is small, therefore, the power consumption cannot be reduced. When the network traffic is small depending upon the time zone and time, wasteful power consumption is caused.

In JP-A-2003-87296, system clock frequency control is exercised by monitoring the connection state every line and monitoring the flow of the network traffic in order to reduce the power consumption in the network relay apparatus. In JP-A-2003-87296, movement to a low power consumption state is conducted in a line in the network relay apparatus when a connection state is not detected or when data communication is not generated over a long time period. Furthermore, system clock frequency control is exercised according to the flow of the network traffic.

SUMMARY OF THE INVENTION

In this scheme, however, frames are discarded when an abrupt change has occurred in the network traffic. Since the current network relay apparatus is utilized as an infrastructure of the society, it is not desirable to discard frames.

The present invention has been made to solve the problem. An object of the present invention is to provide a technique for minimizing the discarded frames and reducing the power consumption in a network relay apparatus which conducts data transfer by using a plurality of network LSIs.

The present invention provides a network relay apparatus which are connected to a plurality of lines and which conducts data transfer by using a plurality of network LSIs. The network relay apparatus includes a transfer engine unit having at least two network LSIs and a central control unit which controls the operation state of the network relay apparatus. The network relay apparatus includes a plurality of network LSIs capable of changing over at least one of a clock and an operation voltage which differ every function block individually implementing a function as components of the transfer engine unit. In addition, the network LSI includes a plurality of function blocks which individually implement functions for conducting data transfer therein, a load judgment unit for judging a load laid upon each of the function blocks or a load of each of the lines, and a frequency voltage control unit for individually changing over at least one of the clock and operation voltage supplied to each function block on the basis of the load of each function block or line judged by the load judgment unit.

In the network relay apparatus according to the present invention, power consumption of a network LSI is reduced by making at least one of the clock and operation voltage while taking a function block as the unit when the load for the network LSI does not need maximum performance.

In the network relay apparatus, the load judgment unit may judge the line load on the basis of a result of reception load measurement on a line. As one of reception load measurement methods in the network relay apparatus, a frame length of an immediately preceding frame and an IFG length are measured. As a result, instantaneous network traffic can be measured. Therefore, a maximum value of network traffic measured within a definite time period is regarded as the reception load. The network relay apparatus may execute flow control prescribed in IEEE 802.3x according to the line processing capability at the time of power consumption reduction.

In the network relay apparatus, the central control unit may judge an operation state of a line by analyzing a control information frame received from another network relay apparatus and give a notice of the operation state to the load judgment unit and the load judgment unit may judge the line load on the basis of the operation state of the line given as the notice. For example, in operation of the network relay apparatus, lines or apparatuses which are not used substantially are specified in some cases according to a network protocol or a policy in the network operation. Specifically, in the Ring protocol prescribed in RFC 3619, STP (Spanning Tree Protocol) prescribed in IEEE 802.ld, VRRP (Virtual Router Redundancy Protocol) prescribed in RFC 2338, GSRP (Gigabit Switch Redundancy Protocol) provided by ALAXALA NETWORKS CORP, VSRP (Virtual Switch Redundancy Protocol) provided by Foundry Networks, and FVRP (Force10 VLAN Redundancy Protocol) provided by Force10 Networks, a specific line is specified to be a standby system line in some cases. In this way, the line specified to be, for example, in the standby system (operation state represented as standby system) can be judged to have a line load of a level of transmitting and receiving a control information frame.

In the VRRP, GSRP, VSRP and FVRP, a network relay apparatus is specified to be a standby system apparatus in some cases.

Paying attention to a reception load of a line in the network relay apparatus is equal to a transmission load of a line in an opposite apparatus, the opposite apparatus for the network relay apparatus may store a scheduled load of the transmission load in a control information frame and give a notice to the network relay apparatus, and upon receiving the control information frame, the network relay apparatus may include a frame analysis unit for analyzing the control information frame and giving notice of the scheduled load of the line to the load judgment unit and the load judgment unit may judge a load of the line on the basis of the scheduled load of the line.

At this time, the opposite apparatus may include a control information generation unit for generating control information to be transmitted to the network relay apparatus, and generate control information on the basis of a transmission load.

The network relay apparatus may further include a frame transmission control unit for controlling frame transmission to another network relay apparatus, and the frame transmission control unit may exercise band control by taking a scheduled load of a line obtained from the control information frame as an upper limit. It becomes possible for the network relay apparatus to specify a scheduled load on a line connected to the opposite apparatus and conduct data communication. In some cases, however, the network relay apparatus transmits network traffic which exceeds a reception load which can be processed by the opposite apparatus because of a temporary increase of network traffic. At this time, it becomes possible to keep the reception load of the opposite apparatus in a processible range by executing band control with the scheduled load preset as an upper limit on the transmission load of the network relay apparatus.

In the network relay apparatus, the frame transmission control unit may further execute delay control on the frame transmission side on a frame which needs delay control, as preferential control. It is considered that a delay longer than that in the conventional technique occurs in the frame transfer processing when the band control with the scheduled load preset as the upper limit is conducted on the transmission load of the network relay apparatus. In communication in which a delay in arrival time poses a problem, such as IP telephone, it is necessary to exercise delay control on data and transfer the data with a low delay. In the case where frame discarding occurs when the band control with the scheduled load preset as the upper limit is conducted on the transmission load of the network relay apparatus, it is considered to be difficult to discriminate a preferential frame and protect it while conducting reception processing in the network relay apparatus. If it is found that frame discarding occurs, therefore, the opposite apparatus may exercise discarding control by discarding frames having a low priority while conducting transmission processing.

In the network relay apparatus, the load judgment unit may judge a load of a line on the basis of a link up state of the line given as a notice by the central control unit. In the network relay apparatus, there are a case where each line is linked up and a case where the line is not linked up. Even if linked up, the link up speed differs from line to line in some cases. If the linked up line speed is slow, therefore, the line speed can be considered to be an upper limit of the line load.

The network relay apparatus may further include a load information transmission unit for exchanging load information between the network LSIs and the load judgment unit may judge a load in a specific function block by adding up loads of a plurality of lines. In the transfer engine unit including a plurality of network LSIs, frame transfer processing is conducted in the network LSIs and consequently transmission to another network LSI is conducted by binding a plurality of lines into a channel. At this time, a load laid upon the channel can be regarded as the sum total of loads of the lines. This channel exists in both a network LSI which transmits data and a network LSI which receives the data.

In the network relay apparatus, the load judgment unit may judge a load in the specific function block by adding up loads laid upon all lines by the load information transmission unit. In the transfer engine unit including a plurality of network LSIs, frame transfer processing is conducted in the network LSIs and consequently a load laid upon a part of the network relay apparatus serving as a switch fabric can be regarded as the sum total of loads of all lines.

In the network relay apparatus, the central control unit may judge an unused function on the basis of the operation state of the network relay apparatus and give a notice of the unused function to the load judgment unit and the load judgment unit may judge a load in the pertinent function block. In many cases, additional functions such as a statistical function and a QoS control function are adopted besides the data transfer in the network relay apparatus. A network manager chooses necessary functions from among these functions and makes them operate. Function blocks for implementing functions which have not been chosen at this time can be judged to be light in load.

According to the present invention, it is possible to minimize the discarded frames and reduce the power consumption in a network relay apparatus which conducts data transfer by using a plurality of network LSIs.

Other objects, features and advantages of the invention will become apparent from the following description of the embodiments of the invention taken in conjunction with the accompanying drawings.

BRIEF DESCRIPTION OF THE DRAWINGS

FIG. 13 is a graph (2) obtained when the scheduled load is judged on the basis of scheduled load information given as a notice by a management server and processing performance is changed.

DESCRIPTION OF THE EMBODIMENTS

Hereafter, embodiments of the present invention will be described with reference to the drawings.

Figure 1:
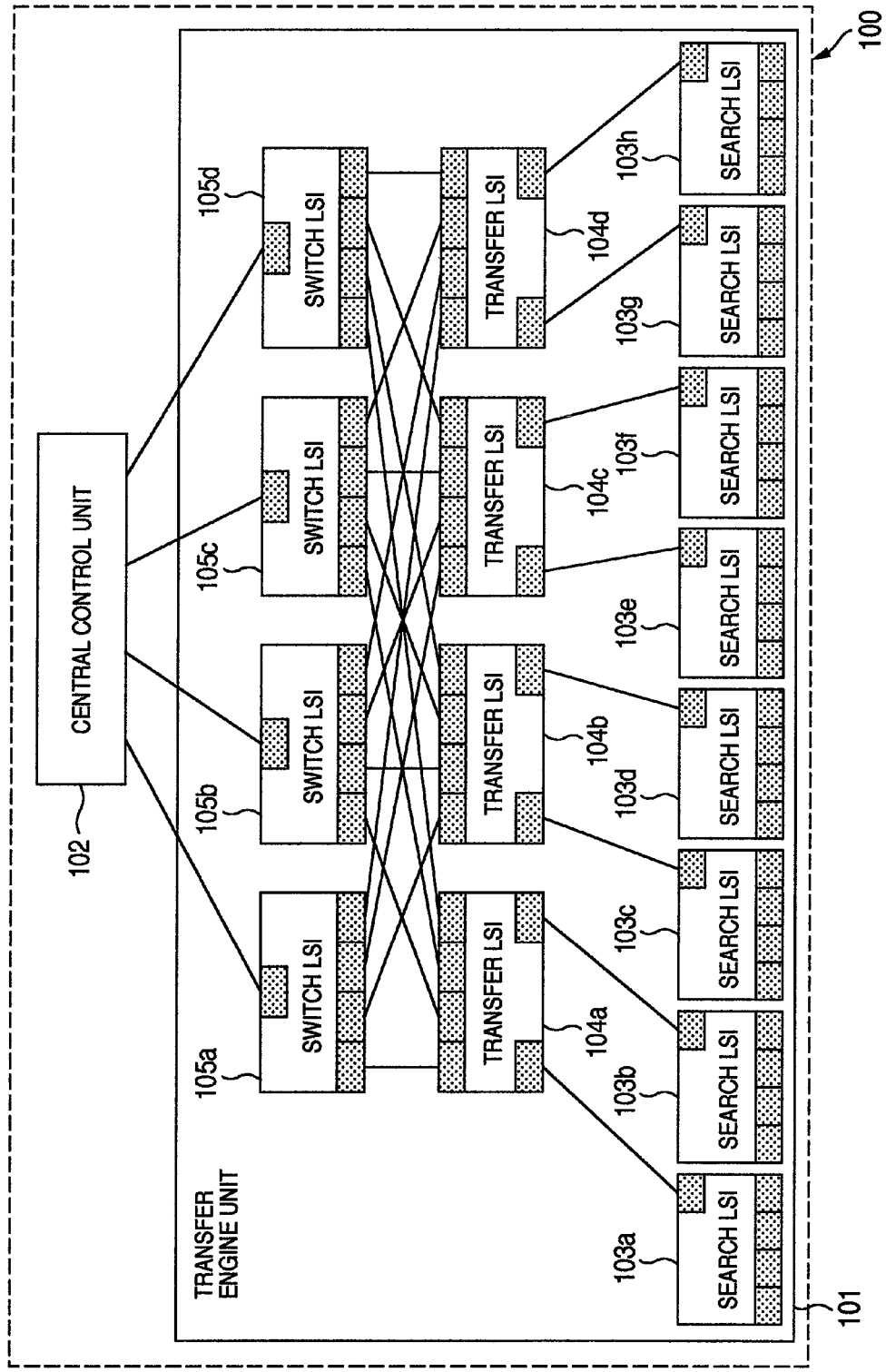
FIG. 1 is a block diagram showing an outline of a network relay apparatus 100 according to an embodiment of the present invention.

FIG. 1 shows an example of a network relay apparatus 100 having a transfer engine unit 101 formed of a plurality of network LSIs and a central control unit 102 which controls the operation state of the network relay apparatus 100. The transfer engine unit 101 shown in FIG. 1 includes eight search LSIs 103, four transfer LSIs 104, and four switch LSIs 105. Each network LSI has channels which connect network LSIs and executes data transfer through the channels.

The search LSI 103 is connected to a plurality of external network lines which are not shown in FIG. 1. The search LSI 103 judges a frame transfer destination port of the network relay apparatus on the basis of header information in frame data, and transfers the frame data to a transfer LSI 104. The transfer LSI 104 transfers the frame data transferred from the search LSI 103 to the four switch LSIs 105 on the basis of a load distribution scheme. Each of the switch LSIs 105 transfers the frame data to a search LSI 103 having a frame transfer destination port of the frame data. The search LSI 103 transfers the frame data to an external network line connected to the frame transfer destination port of the frame data. The eight search LSIs 103 are connected to all of the four switch LSIs 105 via the four transfer LSIs 104. Therefore, each of the eight search LSIs 103 connected to the external network lines bidirectionally can be connected to an arbitrary switch LSI 105 via a transfer LSI 104 connected to the search LSI 103. Since the central control unit shown in FIG. 1 are connected to the four switch LSIs 105, a frame transferred from an arbitrary search LSI 103 can reach the central control unit 102.

Herein, the search LSIs 103, the transfer LSIs 104 and the switch LSIs 105 are simply referred to as "network LSIs" as well. The transfer LSIs 104 capable of conducting transmission and reception are used in the present embodiment. Alternatively, transfer LSIs for reception (not illustrated) and transfer LSIs for transmission (not illustrated) may be provided separately. Furthermore, in the present embodiment, the search LSIs 103 may also be divided according to functions besides the transmission and reception. In such a divisional configuration, each division may be formed of one LSI, or each division may be formed of separate LSIs.

In the present embodiment, frame transfer is executed in a configuration having the transfer LSIs 104 arranged between the search LSIs 103 and the switch LSIs 105. Alternatively, the frame transfer may be executed in a configuration in which the search LSIs 103 are connected to the switch LSIs 105 directly.

Figure 2:
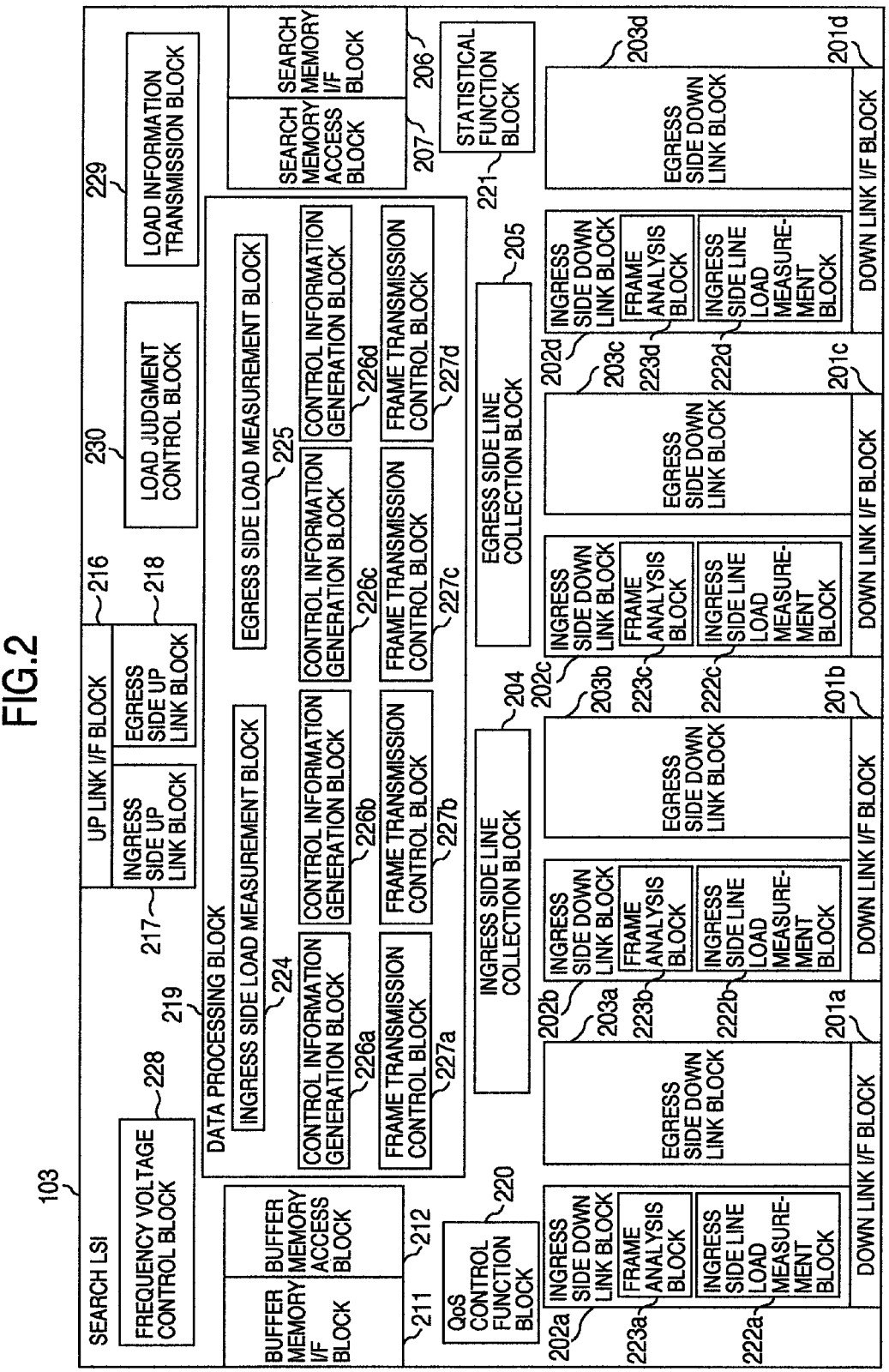
FIG. 2 is a diagram showing function blocks obtained by dividing the inside of a search LSI 103.

FIG. 2 is a diagram showing function blocks obtained by dividing the inside of the search LSI 103.

The search LSI 103 includes:
down link interface blocks 201 each serving as an interface to an external network line;
ingress side down link blocks 202 respectively connected inside the down link interface (I/F) blocks 201;
egress side down link blocks 203 respectively connected inside the down link interface blocks 201;
an ingress side line collection block 204 for collecting the ingress side down link blocks 202;
an egress side line collection block 205 for collecting the egress side down link blocks 203;
a search memory interface block 206 serving as an interface to an external memory for search table which is not illustrated in FIG. 2;
a search memory access block 207 connected inside the search memory interface block 206;
a buffer memory interface block 211 serving as an interface to an external memory for buffer which is not illustrated in FIG. 2;
a buffer memory access block 212 connected inside the buffer memory interface block 211;
an up link interface block 216 serving as an interface to the transfer LSI 104;
an ingress side up link block 217 connected inside the up link interface block 216;
an egress side up link block 218 connected inside the up link interface block 216;
a data processing block 219 for transferring data among the ingress side line collection block 204, the egress side line collection block 205, the search memory access block 207, the ingress side up link block 217, and the egress side up link block 218;
a QoS control function block 220 for implementing a QoS control function;
a statistical function block 221 for implementing a statistical function;
an ingress side line load measurement block 222 for measuring a line load of the ingress side in the ingress side down link block 202;
a frame analysis block 223 for analyzing a frame of the ingress side in the ingress side down link block 202;
an ingress side load measurement block 224 for measuring a line load of every frame transfer destination port of the ingress side in the data processing block 219;
an egress side load measurement block 225 for measuring a line (channel) load of the egress side in the data processing block 219;
a control information generation block 226 for generating control information from a load judgment result of the egress side in the data processing block 219;
frame transmission control blocks 227 for executing preferential control of the egress side in the data processing block 219;
a frequency voltage control block 228 for supplying a clock and an operation voltage to each function block on the basis of load judgment results;
a load information transmission block 229 for exchanging load information with another network LSI; and
a load judgment control block 230 for judging a load of every pertinent function block by judging loads of lines and loads of function blocks.

The search LSI 103 in the present embodiment has a function of judging a frame transfer destination port of the network relay apparatus on the basis of information in a frame header in a received frame and transferring frame data, a function of transferring frame data in accordance with a frame transfer destination port in frame data expansion information transferred from the transfer LSI 104, and a function of judging a frame for control information exchanged between network relay apparatuses and transferring the frame to the central control unit 102.

The search LSI 103 further has a statistical function of, for example, counting the frame transfer quantity.

The search LSI 103 further has a QoS control function of searching a QoS condition table preset by an apparatus manager by using a combination of packet header conditions as a search key, determining priority of transfer processing of packets in the apparatus, and conducting processing preferentially on a packet judged to be high in priority.

The search LSI 103 further has at least one of "a function of converting a frame to a frame format with expansion information such as a frame transfer destination port added and transmitting a resultant frame to the transfer LSI 104" and "a function of dividing a frame and expansion information in cell formats and transmitting resultant cell format data to the transfer LSI 104, and a function of restoring cell format data received from the transfer LSI 104 to a frame and transmitting the frame to an external network line."

In the present embodiment, the search LSI 103 conducts following ingress processing on frame data as described hereafter.

The down link interface block 201 receives frame data and transfers the frame data to the ingress side down link block 202. In addition, frame data of each line is transferred from the ingress side down link block 202 to the ingress side line collection block 204.

At this time, the ingress side line collection block 204 may collect frame data of lines by using time division control.

The frame data in the ingress side line collection block 204 is transferred to the external memory for buffer by the data processing block 219. In the transfer to the external memory for buffer, the frame data is transferred from the data processing block 219 to the external memory for buffer via the buffer memory access block 212 and the buffer memory interface block 211. In addition, the data processing block 219 searches for a frame transfer destination port for the frame data. At this time, access to the external memory for search table is conducted through the search memory access block 207 and the search memory interface block 206. Frame data finished in search processing is transferred from the external memory for buffer to the data processing block 219 via the buffer memory interface block 211 and the buffer memory access block 212. The frame data is provided in the data processing block 219 with frame data expansion information containing the frame transfer destination port information obtained by the search and transferred to the ingress side up link block 217.

At this time, the data processing block 219 may conduct the frame data transfer processing by using arbitration control between blocks.

The frame data in the ingress side up link block 217 is transferred to the transfer LSI 104 via the up link interface block 216.

The search LSI 103 conducts egress processing on frame data as described hereafter.

The up link interface block 216 receives frame data and transfers the frame data to the egress side up link block 218. The frame data in the egress side up link block 218 is transferred to the external memory for buffer by the data processing block 219. In the transfer to the external memory for buffer, the frame data is transferred from the data processing block 219 to the external memory for buffer via the buffer memory access block 212 and the buffer memory interface block 211. The frame data in the external memory for buffer is transferred to the egress side line collection block 205 via the buffer memory interface block 211, the buffer memory access block 212 and the data processing block 219. The frame data in the egress side line collection block 205 is transferred to the egress side down link block 203 connected to a frame transfer destination port, in accordance with frame transfer destination port information contained in frame data expansion information.

At this time, the egress side line collection block 205 may collect frame data of lines by using time division control.

The frame data in the egress side down link block 203 is transferred to an external network line via the down link interface block 201.

In the present invention, the search LSI 103 further has (1) "frame analysis function" of receiving a frame for control information stored with a scheduled load of a transmission traffic and transmitted by an opposite apparatus, via the down link interface block 201, finding a scheduled load of a reception side line by analyzing the received frame for control information and notifying the load judgment control block 230, as a frame analysis function of the frame analysis block 223.

By the way, the frame analysis block 223 in the search LSI 103 is simply referred to as "frame analysis unit" as well.

The frame analysis function of the frame analysis block 223 in the search LSI 103 may be implemented in the central control unit 102. The search LSI 103 further has at least one of the following functions (2) to (8) as a load judgment function of the load judgment control block 230.

(2) "Reception load judgment function" of judging, as ingress side processing, the line load on the basis of a line load measurement result of reception processing (ingress processing) measured by the ingress side line load measurement block 222

(3) "Transmission load judgment function" of judging, as egress side processing, the line load on the basis of a line load measurement result of transmission processing (egress processing) measured by the egress side line load measurement block 225

(4) "Line state judgment function" of judging an upper limit line load if the line is judged to be a standby system line on the basis of an analysis result of a control information frame exchanged between network relay apparatuses (5) "Scheduled load judgment function" of knowing a scheduled load of a reception side line on the basis of notice of the scheduled load of the line which is obtained as a result of an analysis conducted by the frame analysis block 223 on the control information frame transmitted from the opposite apparatus (6) "Line load upper limit judgment function" of judging an upper limit of a load of a line on the basis of a link up state of the line given as a notice by the central control unit 102

(7) "Load prediction and judgment function" of predicting and judging load information by causing load information judged and measured by a load judgment control block or each function block in another network LSI to be given as a notice via the load information transmission block 229

(8) "Function control load judgment function" of judging a load of a function block on the basis of information of an unnecessary function given as a notice by the central control unit 102 on the basis of an operation state of the network relay apparatus The load judgment control block 230 determines a load judgment result of every function block on the basis of a combination of one or more load judgment functions from among (2) to (8). On the basis of the load judgment result of every function block thus determined, the frequency voltage control block 228 supplies a clock and an operation voltage to each function block.

The search LSI 103 further has (9) "control information generation function" of generating scheduled load information to be transmitted to the opposite apparatus on the basis of a load judgment result of an egress side line obtained by using the (3) "transmission load judgment function" as a control information generation function of the control information generation block 226.

By the way, the control information generation block 226 in the search LSI 103 is simply referred to as "control information generation unit" as well.

The function of the control information generation block 226 in the search LSI 103 may be implemented in the central control unit 102.

The search LSI 103 further has at least one of (10) "band control function" of conducting transmission by using a band matched to the scheduled load information as a band of transmission to the opposite apparatus, (11) "delay control function" of reducing the latency by preferentially transmitting a frame which must be transmitted with a low latency during execution of the band control, and (12) "discarding control function" of executing discarding of a low priority frame when frame discarding occurs during execution of the band control.

By the way, the frame transmission control block 227 in the search LSI 103 is simply referred to as "frame transmission control unit" as well.

Figure 3:
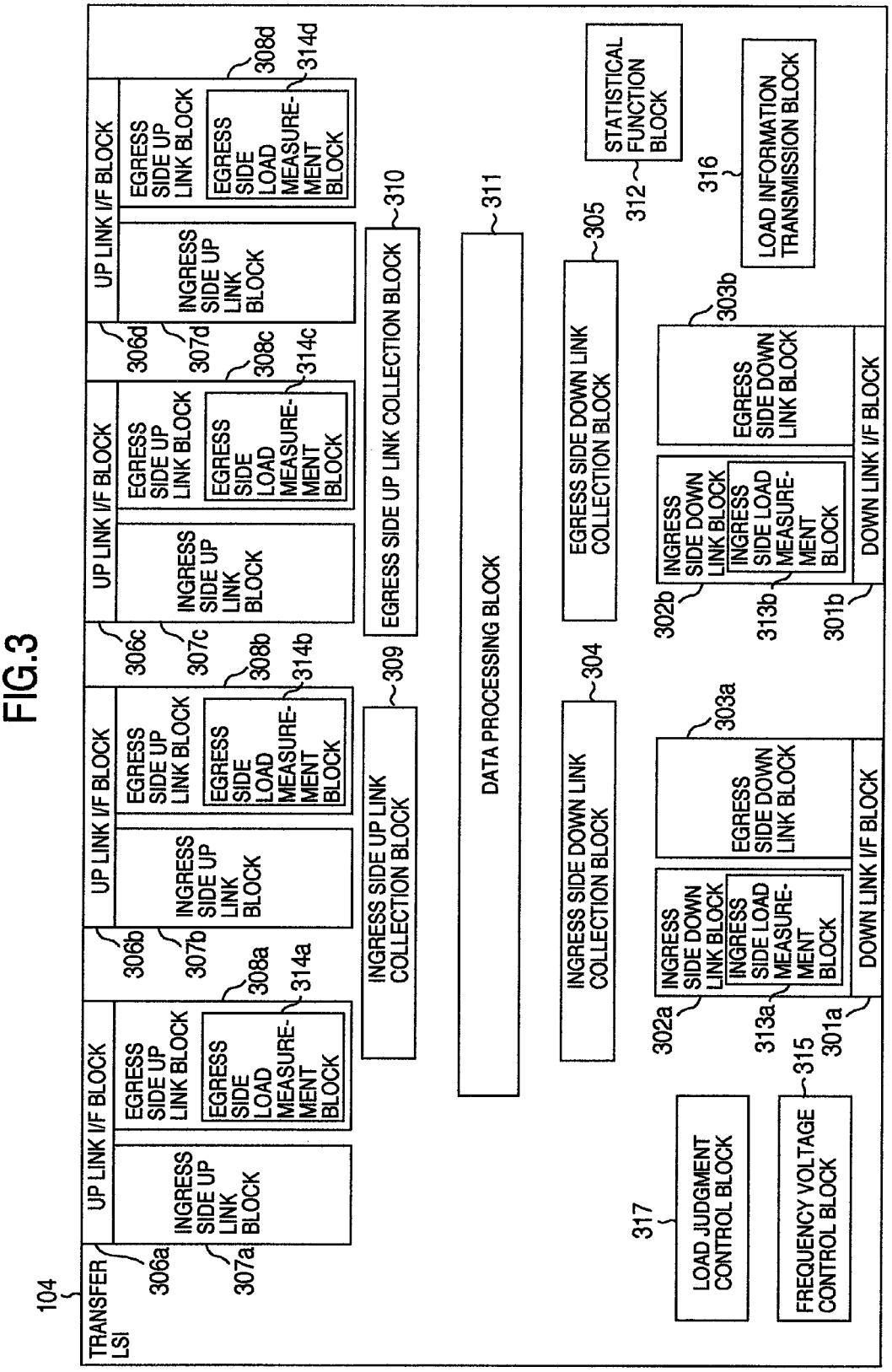
FIG. 3 is a diagram showing function blocks obtained by dividing the inside of a transfer LSI 104.

FIG. 3 is a diagram showing function blocks obtained by dividing the inside of the transfer LSI 104.

The transfer LSI 104 includes:
down link interface blocks 301 each serving as an interface to the search LSI 103;
ingress side down link blocks 302 respectively connected inside the down link interface block 301;

egress side down link blocks 303 respectively connected inside the down link interface block 301;

an ingress side down link collection block 304 for collecting the ingress side down link blocks 302;

an egress side down link collection block 305 for collecting the egress side down link blocks 303;

up link interface blocks 306 each serving as an interface to the switch LSI 105;

ingress side up link blocks 307 respectively connected inside the up link interface block 306;

egress side up link blocks 308 respectively connected inside the up link interface block 306;

an ingress side up link collection block 309 for collecting the ingress side up link blocks 307;

an egress side up link collection block 310 for collecting the egress side up link blocks 308;

a data processing block 311 for transferring data among the ingress side down link collection block 304, the egress side down link collection block 305, the ingress side up link collection block 309, and the egress side up link collection block 310;

a statistical function block 312 for implementing a statistical function;

an ingress side load measurement block 313 for measuring a line (channel) load of the ingress side in the ingress side down link block 302;

an egress side load measurement block 314 for measuring a line (channel) load of the egress side in the egress side up link block 308;

a frequency voltage control block 315 for supplying a clock and an operation voltage to each function block on the basis of load judgment results;

a load information transmission block 316 for exchanging load information with another network LSI; and a load judgment control block 317 for judging a load of every function block by judging loads of lines (channels) and loads of function blocks.

The transfer LSI 104 has a function of transferring frame data received from the search LSI 103 to the switch LSI 105, and a function of transferring frame data received from the switch LSI 105 to a pertinent search LSI 103 on the basis of expansion information containing transfer destination port information.

In the case where the data format between the search LSI 103 and the transfer LSI 104 is the frame format, the transfer LSI 104 may have at least one of "a function of dividing frames and expansion information such as a frame transfer destination port into cell format data, transferring the cell format data to the switch LSI 105, restoring cell format data received from the switch LSI 105 to frames, and transmitting the frames to an external network line" and "a function of dividing frames and expansion information into bit slice formats each having a plurality of bits, transferring the bit slice format data to the switch LSI 105, restoring bit slice format data to frames, and transmitting the frames to an external network line."

The transfer LSI 104 further has a statistical function of, for example, counting the frame data transfer quantity.

In the present embodiment, the transfer LSI 104 conducts following ingress processing on frame data as described hereafter.

The down link interface block 301 receives frame data and transfers the frame data to the ingress side down link block 302. In addition, frame data of each channel is transferred from the ingress side down link block 302 to the ingress side down link collection block 304.

At this time, the ingress side line collection block 304 may collect frame data of channels by using time division control.

The frame data in the ingress side down link collection block 304 is transferred to the ingress side up link collection block 309 by the data processing block 311.

At this time, the data processing block 311 may conduct the frame data transfer processing by using arbitration control between blocks.

The frame data in the ingress side up ink collection block 309 is transferred to an ingress side up link block 307 connected to a switch LSI 105 which is specified on the basis of the load distribution scheme.

At this time, the ingress side up link collection block 309 may collect frame data of channels by using time division control.

The frame data in the ingress side up link block 307 is transferred to the switch LSI 105 via the up link interface block 306.

The transfer LSI 104 conducts egress processing on frame data as described hereafter.

The up link interface block 306 receives frame data and transfers the frame data to the egress side up link block 308. In addition, frame data on each channel is transferred from the egress side up link block 308 to the egress side up link collection block 310.

At this time, the egress side up link collection block 310 may collect frame data of channels by using time division control.

The frame data in the egress side up link collection block 310 is transferred to the egress side down link collection block 305 by the data processing block 311. Frame data in the egress side down link collection block 305 is transferred to the egress side down link block 303 connected to a search LSI 103 having a frame transfer destination port in accordance with frame transfer destination port information contained in frame data expansion information.

At this time, the egress side down link collection block 303 may collect frame data of channels by using time division control. The frame data in the egress side down link block 303 is transferred to the search LSI 103 via the down link interface block 301.

In the present invention, the transfer LSI 104 further has at least one of the following functions (13) to (16) as a load judgment function of the load judgment control block 317.

(13) "Reception load judgment function" of judging, as ingress side processing, the channel load on the basis of a channel load measurement result of reception processing (ingress processing) measured by the ingress side load measurement block 313

(14) "Transmission load judgment function" of judging, as egress side processing, the channel load on the basis of a channel load measurement result of transmission processing (egress processing) measured by the egress side load measurement block 314

(15) "Load prediction and judgment function" of predicting and judging load information by causing load information judged and measured by a load judgment control block or each function block in another network LSI to be given as a notice via the load information transmission block 316

(16) "Function control load judgment function" of judging a load of a function block on the basis of information of an unnecessary function given as a notice by the central control unit 102 on the basis of an operation state of the network relay apparatus The load judgment control block 317 determines a load judgment result of each function block on the basis of a combination of one or more load judgment functions from among (13) to (16). On the basis of the load judgment result of each function block thus determined, the frequency voltage control block 315 supplies a clock and an operation voltage to each function block.

Figure 4:
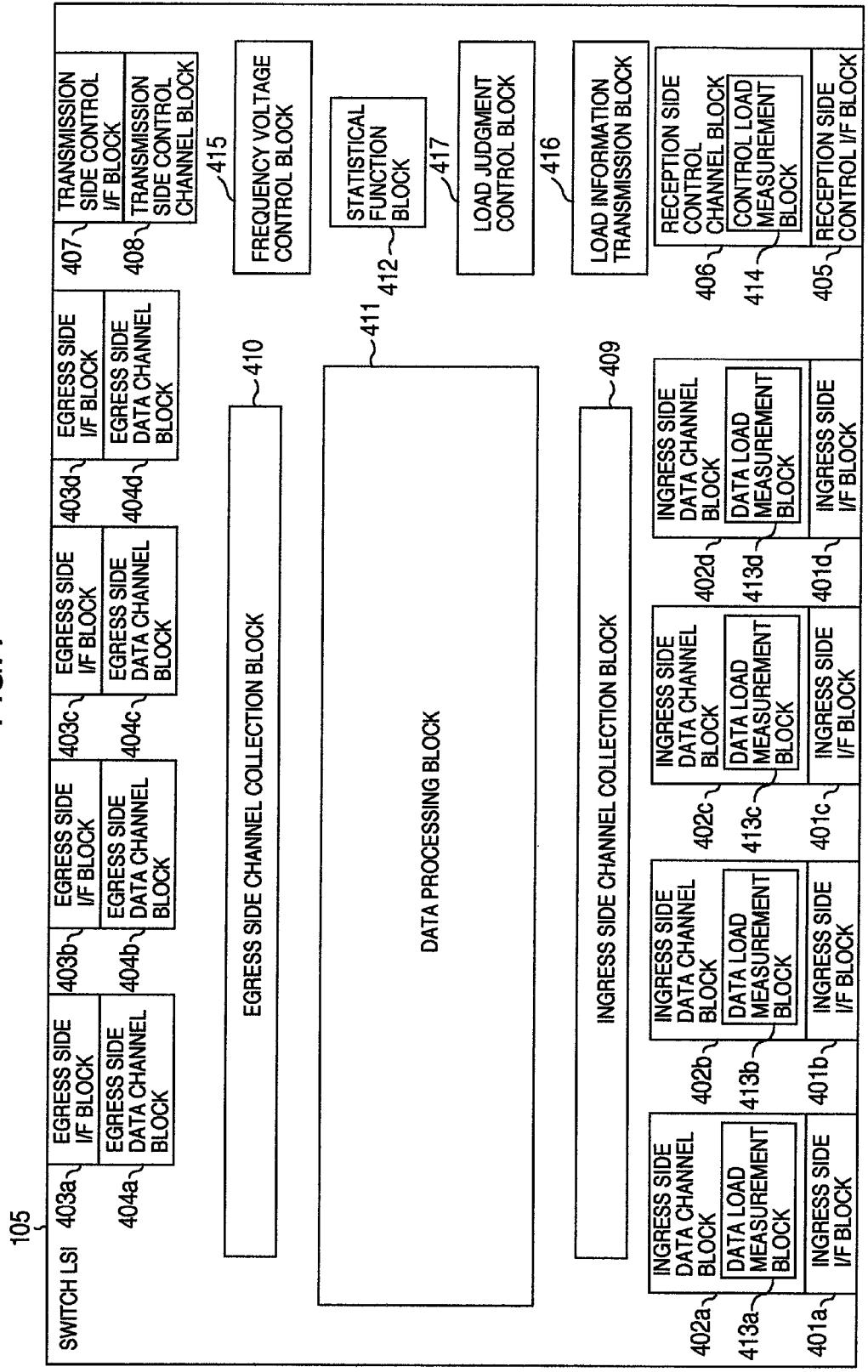
FIG. 4 is a diagram showing function blocks obtained by dividing the inside of a switch LSI 105.

FIG. 4 is a diagram showing function blocks obtained by dividing the inside of the switch LSI 105.

The switch LSI 105 includes:

ingress side interface blocks 401 each serving as an ingress side interface to the transfer LSI 104;

ingress side data channel blocks 402 respectively connected inside the ingress side interface blocks 401;

egress side interface blocks 403 each serving as an egress side interface to the transfer LSI 104;

egress side data channel blocks 404 respectively connected inside the egress side interface blocks 403;

a reception side control interface block 405 serving as a reception side interface to the central control unit 102;

a reception side control channel block 406 connected inside the reception side control interface block 405;

a transmission side control interface block 407 serving as a transmission side interface to the central control unit 102;

a transmission side control channel block 408 connected inside the transmission side control interface block 407;

an ingress side channel collection block 409 for collecting the ingress side channel blocks 402 and the reception side control channel block 406;

an egress side channel collection block 410 for collecting the egress side channel blocks 404 and the transmission side control channel block 406;

a data processing block 411 for transferring data between the ingress side channel collection block 409 and the egress side channel collection block 410;

a statistical function block 412 for implementing a statistical function;

data load measurement blocks 413 for measuring a line (channel) load of the ingress side channel in the ingress side down link block 302;

a control load measurement block 414 for measuring a line (channel) load of the reception side control channel in the reception side control channel block 406;

a frequency voltage control block 415 for supplying a clock and an operation voltage to each function block on the basis of load judgment results;

a load information transmission block 416 for exchanging load information with another network LSI; and a load judgment control block 417 for judging a load of each function block by judging loads of lines (channels) and loads of function blocks.

By the way, a combination formed of at least one of the frequency voltage control block 228 in the search LSI 103, the frequency voltage control block 315 in the transfer LSI 104 and the frequency voltage control block 415 in the switch LSI 105 is simply referred to as "frequency voltage control unit" as well.

By the way, a combination formed of at least one of the load information transmission block 229 in the search LSI 103, the load information transmission block 316 in the transfer LSI 104 and the load information transmission block 416 in the switch LSI 105 is simply referred to as "load information transmission unit" as well.

The switch LSI 105 has a function of transferring frame data received from the transfer LSI 104 to a pertinent transfer LSI 104 on the basis of expansion information.

The switch LSI 104 further has a statistical function of, for example, counting the frame data transfer quantity.

In the present embodiment, the switch LSI 105 conducts following frame data transfer processing as described hereafter.

The ingress side interface block 401 receives frame data and transfers the frame data to the ingress side data channel block 402. In addition, frame data of each channel is transferred from the ingress side data channel block 402 to the ingress side channel collection block 409.

At this time, the ingress side channel collection block 409 may collect frame data of channels by using time division control.

The frame data in the ingress side channel collection block 409 is transferred to the ingress side channel collection block 410 by the data processing block 411.

At this time, the data processing block 411 may conduct the frame data transfer processing by using arbitration control between blocks.

The frame data in the egress side channel collection block 410 is transferred to an egress side data channel block 404 connected to a transfer LSI 104 which can transfer the frame data to a frame transfer destination port, in accordance with frame transfer destination port information contained in frame data expansion information. If the frame data is a control information frame at this time, the frame data is transferred to the transmission side control channel block 408 connected to the central control unit 102.

At this time, the egress side channel collection block 410 may collect frame data of channels by using time division control.

The frame data in the egress side channel block 404 is transferred to the transfer LSI 104 via the egress side interface block 403. If the frame data is a control information frame at this time, the frame data in the transmission side control channel block 408 is transferred to the central control unit 102 via the transmission side control interface block 407.

The switch LSI 105 conducts frame data transfer processing on the control information frame generated in the central control unit 102 as described hereafter.

The reception side control interface block 405 receives frame data and transfers the frame data to the reception side control channel block 406. In addition, frame data in the reception side control channel block 406 is transferred to the ingress side channel collection block 409. The frame data in the ingress side channel collection block 409 is transferred to the egress side channel collection block 410 by the data processing block 411. The frame data in the egress side channel collection block 410 is transferred to an egress side data channel block 404 connected to a transfer LSI 104 which can transfer the frame data to a frame transfer destination port, in accordance with frame transfer destination port information contained in frame data expansion information. The frame data in the egress side data channel block 404 is transferred to the transfer LSI 104 via the egress side interface block 403.

In the present invention, the switch LSI 105 further has at least one of the following functions (17) to (19) as a load judgment function of the load judgment control block 417.

(17) "Reception load judgment function" of judging, as ingress side processing, the channel load on the basis of a channel load measurement result of reception processing (ingress processing) measured by the data load measurement block 413

(18) "Load prediction and judgment function" of predicting and judging load information by causing load information judged and measured by a load judgment control block or each function block in another network LSI to be given as a notice via the load information transmission block 416

(19) "Function control load judgment function" of judging a load of a function block on the basis of information of an unnecessary function given as a notice by the central control unit 102 on the basis of an operation state of the network relay apparatus The load judgment control block 417 determines a load judgment result of each function block on the basis of a combination of one or more load judgment functions from among (17) to (19). On the basis of the load judgment result of each function block thus determined, the frequency voltage control block 415 supplies a clock and an operation voltage to each function block.

The central control unit 102 has the following function (20) as a load judgment function.

(20) "Scheduled load adjustment function" of receiving a notice of scheduled load information which indicates a scheduled load of each line included in the network relay apparatus 100, from a management server placed inside or outside the network relay apparatus 100 and judging a scheduled load of each line and a load of each function block By the way, a combination formed of at least one of the load judgment control block 230 in the search LSI 103, the load judgment control block 317 in the transfer LSI 104 and the load judgment control block 417 in the switch LSI 105 is simply referred to as "load judgment control unit" as well.

In the present invention, reduction of the power consumption is implemented by changing over, in the frequency voltage control unit, at least one of the clock and operation voltage supplied to each of the function blocks in the network LSI on the basis of the load judgment result in the load judgment unit.

In the present invention, the load judgment method in the load judgment unit becomes an important element in implementation of power consumption reduction. Hereafter, the load judgment method in the load judgment unit will be described.

A. Load judgment method based on load measurement:
B. Load judgment method based on operation state judgment of the line:
C. Load judgment method based on scheduled load exchange between network relay apparatuses:
D. Load judgment method based on link up state judgment of the line:
E. Load judgment method based on load information exchange between network LSIs:
F. Load judgment method based on specific function operation state judgment:
G. Load judgment method based on the scheduled load information notice of the management server:

A. Load Judgment Method Based on Load Measurement:

According to the present load judgment method, a load is judged on the basis of an actual load on a channel (or line) and a load for a corresponding function block is judged on the basis of a result of the load judgment. In the present embodiment, the load judgment function indicates a combination of at least one of (2) "reception load judgment function" and (3) "transmission load judgment function" in the search LSI 103, (13) "reception load judgment function" and (14) "transmission load judgment function" in the transfer LSI 104, and (17) "reception load judgment function" in the switch LSI 105. In TABLE 1 described later, the function blocks in the network LSI are sorted according to the load judgment method. For example, in the case of the search LSI 103 in item No. 1, it is indicated that the load of the ingress side down link block 202 can be judged on the basis of the ingress side load of the channel (line). For example, in judging the load of the ingress side down link block 202*a* shown in FIG. 2, therefore, the load should be judged on the basis of a measurement result in the ingress side line load measurement block 222*a* by using (2) "reception load judgment function" of the search LSI 103 as the load judgment function.

For example, in the case of the search LSI 103 in item No. 3 shown in TABLE 1, it is indicated that the load of the search memory access block 207 can be judged on the basis of the total load on all channels in the LSI. Therefore, the load of the search memory access block 207 should be judged by using both (2) "reception load judgment function" and (3) "transmission load judgment function" of the search LSI 103 as the load judgment function.

Reduction of the power consumption is implemented by changing over, in the frequency voltage control unit, at least one of the clock and operation voltage supplied to each of the function blocks on the basis of the load judgment result of each judged function block.

Furthermore, in the present load judgment method, occurrence of frame discarding may be prevented by using the flow control prescribed by IEEE 802.3x.

B. Load Judgment Method Based on Operation State Judgment of the Line:

According to the present load judgment method, a load is judged on the basis of a line operation state and a load on a corresponding function block is judged on the basis of a result of the load judgment. In the present embodiment, the load judgment function indicates (4) "line state judgment function" in the search LSI 103. In (4) "line state judgment function," the line state is judged according to a protocol such as the Ring, STP, VRRP, GSRP, VSRP or FVRP by analyzing, in the central control unit 102, the control information frame exchanged between network relay apparatuses and the load of a line judged as a standby system line is judged.

In a protocol such as the VRRP, GSRP, VSRP or FVRP, the whole apparatus is used as a standby system apparatus sometimes.

Figure 5:
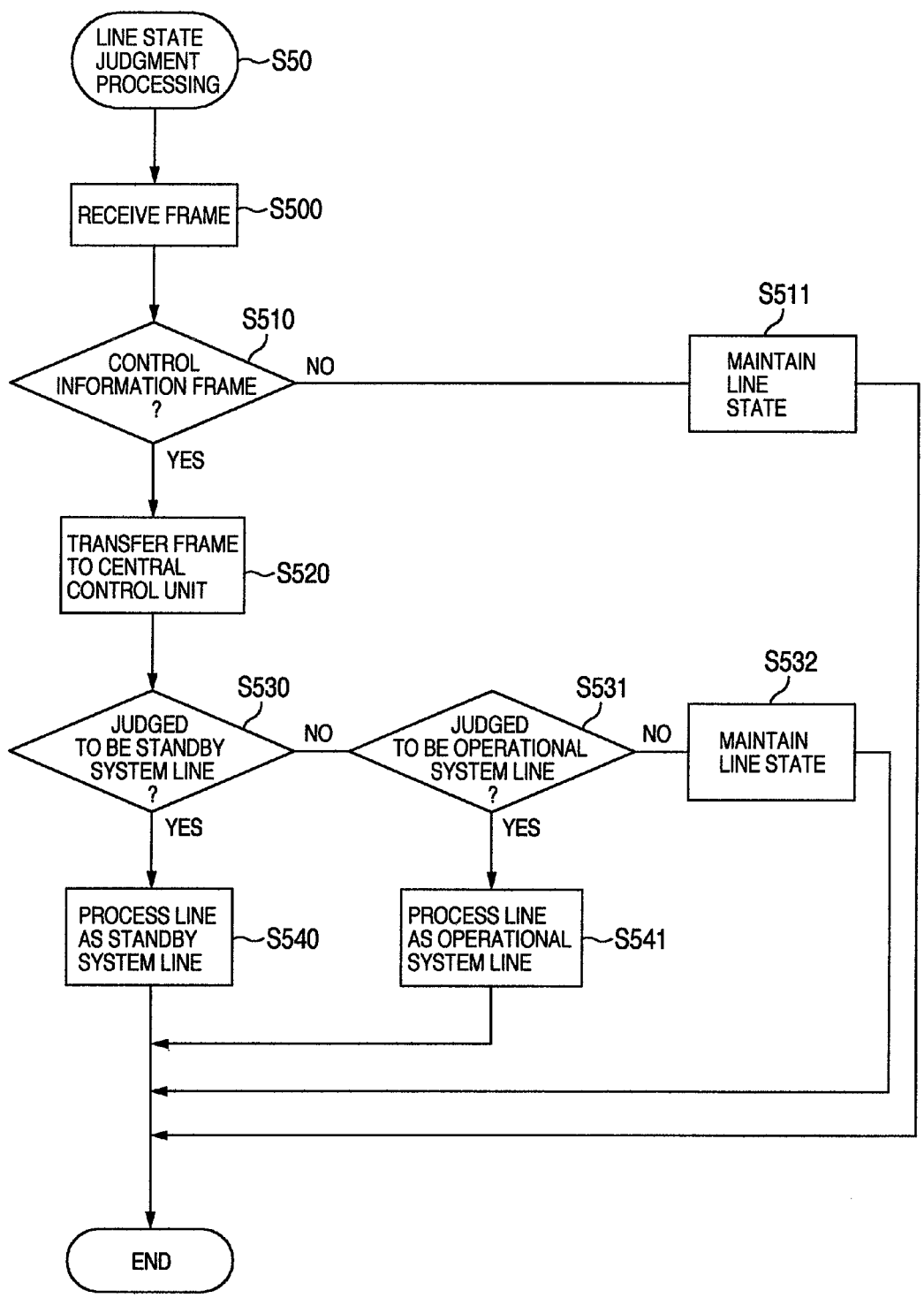
FIG. 5 is a flow chart of line state judgment processing conducted every frame reception.

The line state judgment may be executed every frame reception. FIG. 5 shows a routine of line state judgment processing (step S50) conducted whenever a frame is received. As an example, operation in the STP will now be described.

At step S500, frame reception on the line is recognized and the processing is advanced to step S510. At the step S510, a judgment is made about whether the received frame is a control information frame. The judgment of the control information frame is made by, for example, analyzing a frame header in the search LSI 103. If a frame other than the control information frame is received, the processing is advanced to step S511. At the step S511, the line state is maintained. In the STP, nothing is conducted as processing.

If the received frame is the control information frame at the step S510, then the processing is advanced to step S520. At the step S520, the received control information frame is transferred to the central control unit 102 and the processing is advanced to step S530. At the step S530, the received control information frame is analyzed and a judgment is made about whether the line is a standby system line. The analysis of the control information frame is conducted in the central control unit 102 according to protocol processing. If the line is judged to be a standby system line, the processing is advanced to step S540. If the line is judged to be in the blocking state, the line is judged to be a standby system line in the STP. At the step S540, the line is processed as a standby system line. A notice that the line is a standby system line is given to a load judgment control block 230 in the search LSI 103 having the pertinent line.

If the line is not judged to be a standby system line at the step S530, the processing is advanced to step S531. At the step S531, the received control information frame is analyzed and a judgment is made about whether the line is an operational system line. The analysis of the control information is conducted in the central unit on the basis of protocol processing. If the line is judged to be an operational system line, the processing is advanced to step S541. If the line is judged to be in the listening state, the learning state, or the forwarding state, the line is judged to be an operational system line in the STP. At the step S541, the line is processed as an operational system line. If the line is an operational system line, the load judgment control block 230 in the search LSI 103 having the pertinent line is notified thereof.

If the line is not judged to be an operational system line, the processing is advanced to step S532. At the step S532, the line state is maintained. In the STP, nothing is conducted as processing. For example, in the case of the search LSI 103 in item No. 1 shown in TABLE 1, it is indicated that the load of the ingress side down link block 202 can be judged on the basis of the ingress side load of the channel (line). For example, in judging the load of the ingress side down link block 202a shown in FIG. 2, therefore, (4) "line state judgment function" in the search LSI 103 is used as the load judgment function. If the line connected to the down link interface block 201a is judged to be a standby system line, then the load exerted upon the line is considered to be at a level of transmitting and receiving a control information frame. As a result, the load of the ingress side down link block 202a can be judged.

Reduction of the power consumption is implemented by changing over, in the frequency voltage control unit, at least one of the clock and operation voltage supplied to each of the function blocks on the basis of the load judgment result of each judged function block.

C. Load Judgment Method Based on Scheduled Load Exchange between Network Relay Apparatuses:

In the present load judgment method, the load is judged by exchanging a scheduled transmission load of every line between network relay apparatuses and the load for a corresponding function block is judged on the basis of a result of the load judgment. In the present embodiment, (5) "scheduled load judgment function" in the search LSI 103 is indicated as the load judgment function.

In the present load judgment method, (1) "frame analysis function" in the search LSI 103 and (9) "control information generation function" in the search LSI 103 may be combined to function.

The present load judgment method in the case where (1) "frame analysis function" and (9) "control information generation function" are not combined in the search LSI 103 includes the steps of transferring a control information frame received on the line to the central control unit 102, judging a scheduled load on a reception line which receives transmission from another network apparatus on the basis of an analysis result in the central control unit 102, and generating and transferring a control information frame which indicates a scheduled transmission load for another network relay apparatus in the central control unit 102 on the basis of a result of transmission load judgment judged by using (3) "transmission load judgment function" of every line.

When combined in function with (1) "frame analysis function" in the search LSI 103, the control information frame received by the line is analyzed in the frame analysis block 223 in the search LSI 103 without be passed through the central control unit 102 by using (1) "frame analysis function" in the search LSI 103 and a scheduled load on a reception line which receives transmission from another network apparatus is judged.

When combined in function with (9) "control information generation function" in the search LSI 103, a control information frame which indicates a scheduled transmission load for another network relay apparatus is generated and transferred without passing through the central control unit 102 on the basis of the transmission load judgment result of each line in the search LSI 103 (judged on the basis of (3) "transmission load judgment function") by using (9) "control information generation function" in the search LSI 103.

In the present load judgment method, control information frame analysis processing and control information frame generation processing can be executed without passing through the central processing unit 102 in scheduled load exchange by combining the present load judgment method with these functions.

Furthermore, the present load judgment method may be combined in function with the frame transmission control function in the search LSI 103. The frame transmission control function in the search LSI 103 has at least one of (10) band control function of conducting transmission by using a band fitted to a scheduled load as a band for transmission to an opposite apparatus, (11) delay control function for a frame which must be transmitted with a low latency during execution of the band control, and (12) "discarding control function" of executing discarding of a low priority frame when frame discarding occurs during execution of the band control.

Hereafter, it is supposed that the present load judgment method is made to function by combining (1) "frame analysis function" in the search LSI 103 with (9) "control information generation function" in the search LSI 103.

In the ensuing description, however, processing conducted by (1) "frame analysis function" in the search LSI 103 with (9) "control information generation function" in the search LSI 103 may be conducted by the central processing unit 102.

In (10) "band control function," band control processing can be conducted on network traffic transmitted from the network relay apparatus to the opposite apparatus.

Figure 6:
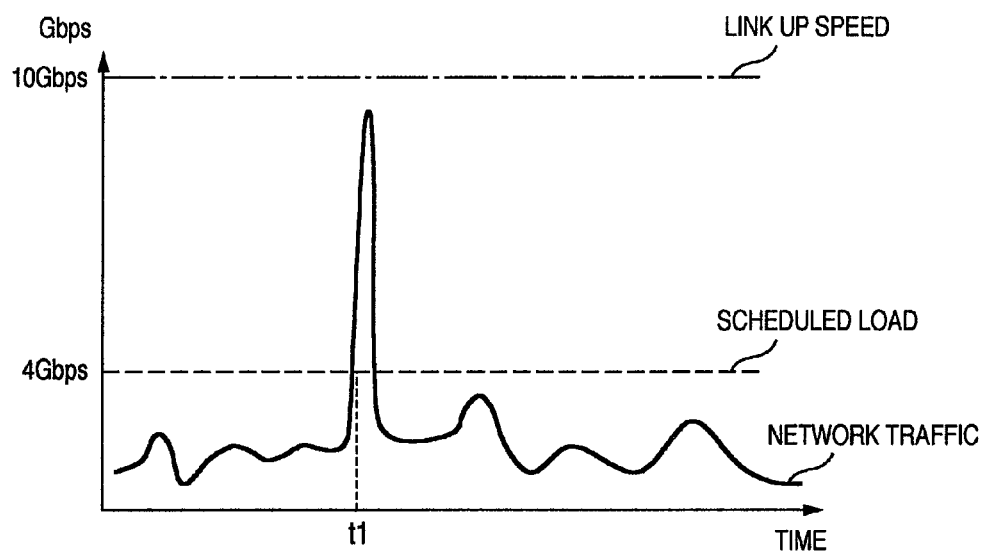
FIG. 6 is a network traffic variation graph (1) at the time when band control processing is not executed.

FIG. 6 shows an example of a time-series graph which indicates a variation of the network traffic obtained when the band control processing is not executed. The graph in FIG. 6 shows the variation of the network traffic, link up speed and scheduled load obtained when the band control processing is not executed, in a time series form. In the graph shown in FIG. 6, the link up speed is 10 Gbps and the scheduled load is 4 Gbps.

In FIG. 6, however, burst transfer of network traffic occurs instantaneously and the scheduled load is exceeded at time t1. The opposite apparatus lowers the processing performance of the line according to the scheduled load given as a notice by using the control information frame. Therefore, it is considered that frame discarding occurs if burst transfer of network traffic occurs.

Figure 7:
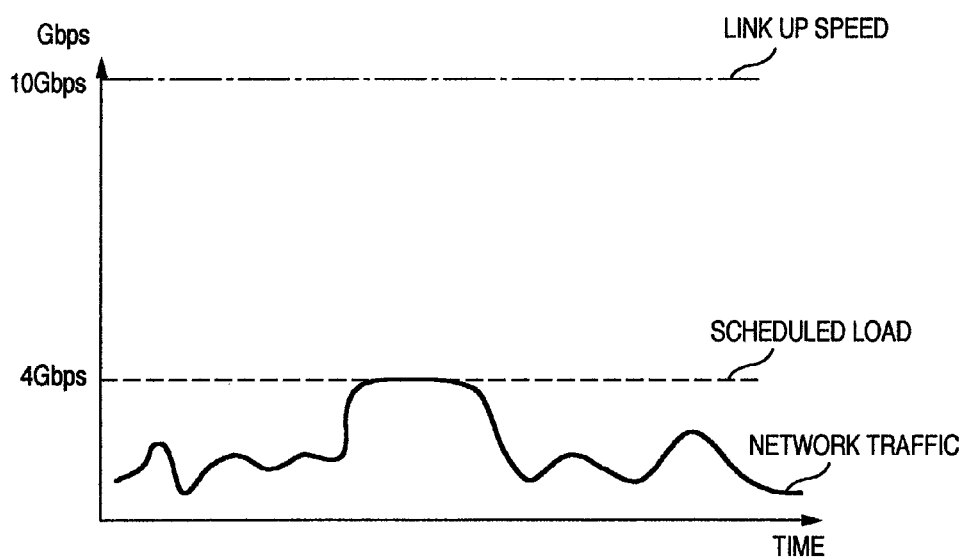
FIG. 7 is a network traffic variation graph (1) at the time when band control processing is executed.

FIG. 7 shows an example of a time-series graph which indicates a variation of the network traffic obtained when the band control processing is executed. The graph in FIG. 7 shows the variation of the network traffic, link up speed and scheduled load obtained when the band control processing is executed, in a time series form. In the graph shown in FIG. 7, the link up speed is 10 Gbps and the scheduled load is 4 Gbps.

In the case of the graph shown in FIG. 7, the network relay apparatus executes band control processing on network traffic to be transmitted to the opposite apparatus with the scheduled load set as an upper limit. Therefore, it is considered that frame discarding is not occurring in the opposite apparatus.

Figure 8:
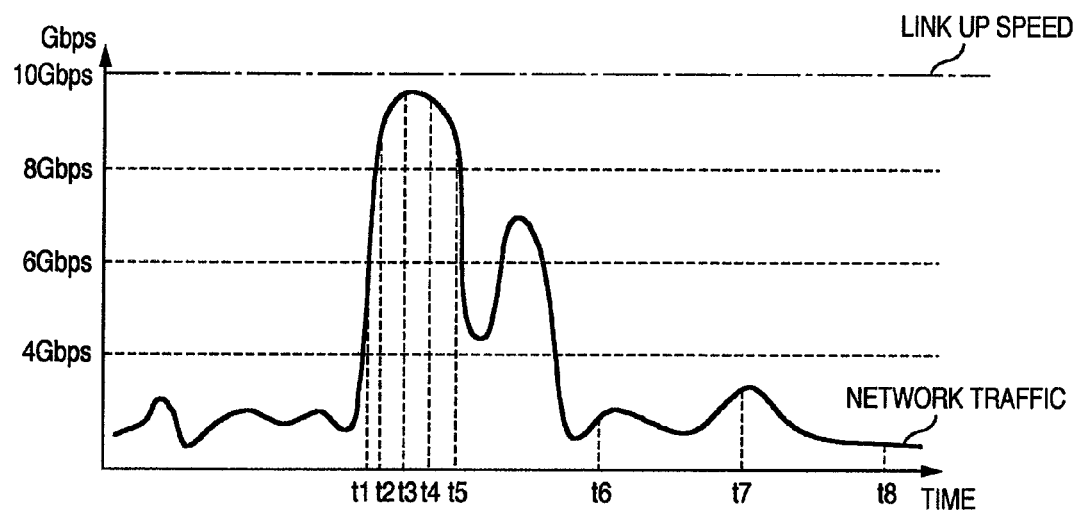
FIG. 8 is a network traffic variation graph (2) at the time when band control processing is not executed.

The case where frame discarding occurs even if band control with the scheduled load set as un upper limit is executed is considerable. FIG. 8 shows an example of a time-series graph which indicates a variation of the network traffic obtained when the band control processing is not executed in the same way as FIG. 6. The graph in FIG. 8 shows the variation of the network traffic, link up speed and scheduled load obtained when the band control processing is not executed, in a time series form. In the graph shown in FIG. 8, the link up speed is 10 Gbps.

In the graph shown in FIG. 8, burst transfer of network traffic occurs in the same way as the graph shown in FIG. 6.

For example, in the case of the graph shown in FIG. 8, it is considered that frame discarding occurs if the scheduled load of the line is 4 Gbps and the band control is not executed.

On the other hand, in the case of FIG. 8, it is considered that frame discarding occurs in the network relay apparatus even if the band control processing is executed on the network traffic to be transmitted to the opposite apparatus with the scheduled load 4 Gbps set as the upper limit because the load of the network traffic is too large as compared with the scheduled load.

In the present load judgment method, therefore, frame discarding may be prevented by conducting scheduled load variation judgment processing of judging the variation of the line transmission scheduled load and varying the scheduled load according to the network traffic by using (9) "control information generation function" in the search LSI 103.

Figure 9:
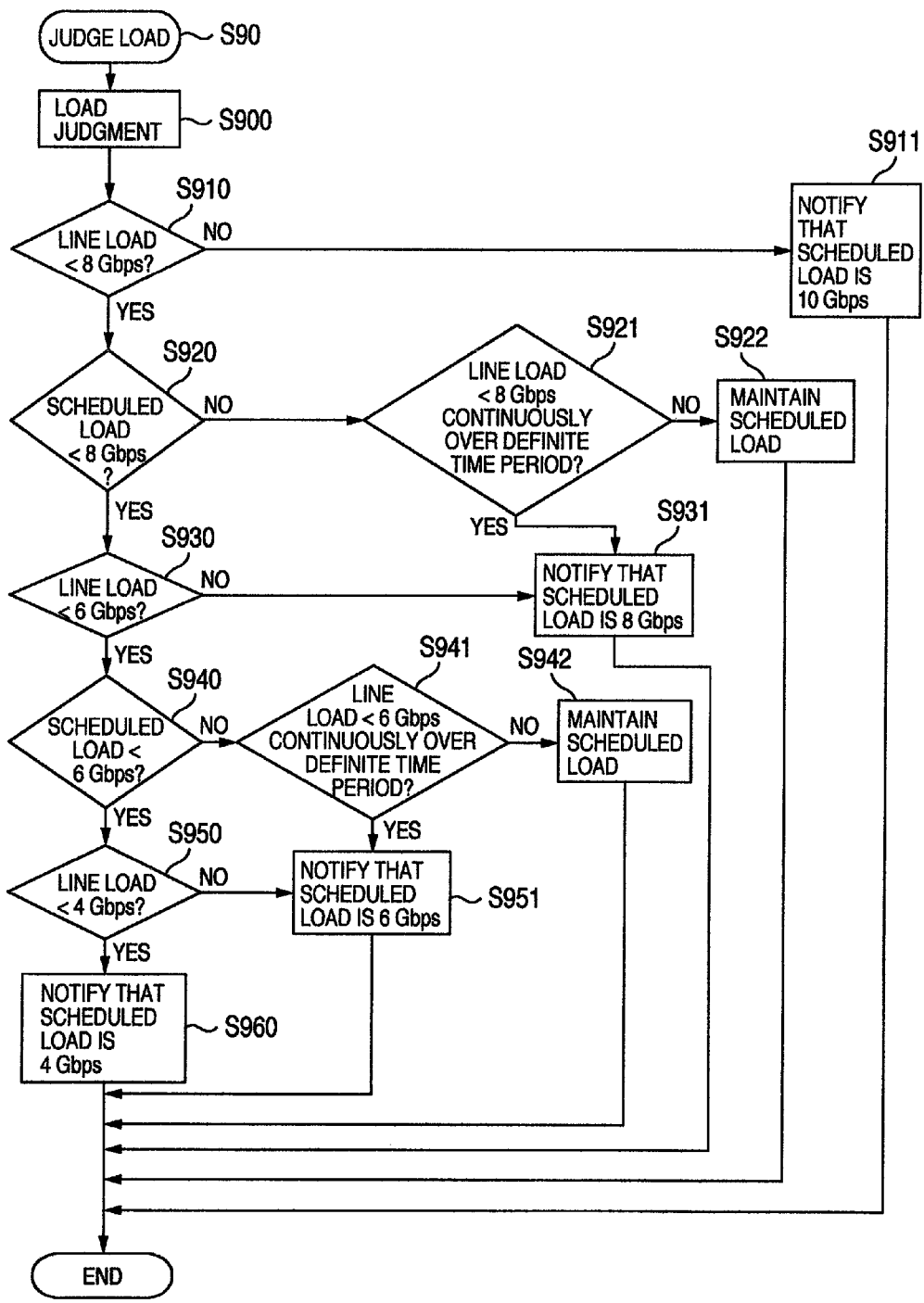
FIG. 9 is a flow chart of scheduled load variation judgment processing.

FIG. 9 shows an example of a scheduled load variation judgment processing (step S90) routine. In FIG. 9, the scheduled load is set to one of four values: 4 Gbps, 6 Gbps, 8 Gbps and 10 Gbps, and scheduled load variation thresholds to be compared with the line load to vary the scheduled load are provided with the same values as the scheduled load.

At step S900, the load judgment control block 230 in the search LSI 103 judges a transmission load of a line by using (3) "transmission load judgment function" and the processing is advanced to step S910. At the step S910, it is judged whether the transmission load judgment result of the line is less than 8 Gbps by using (9) "control information generation function" in the search LSI 103. If the transmission load judgment result of the line is at least 8 Gbps, the processing is advanced to step S911. At the step S911, the opposite apparatus is notified that the scheduled load of the line is 10 Gbps.

If the line transmission load judgment result is less than 8 Gbps at the step S910, the processing is advanced to step S920. At the step S920, it is judged whether the scheduled load of the line is less than 8 Gbps. If the scheduled load of the line is at least 8 Gbps, the processing is advanced to step S921. At the step S921, it is judged whether the transmission load judgment result of the line has become less than 8 Gbps continuously over a definite time period. Unless the transmission load judgment result of the line has become less than 8 Gbps continuously over the definite time period, the processing is advanced to step S922. At the step S922, the scheduled load of the line is maintained.

If the transmission load judgment result of the line has become less than 8 Gbps continuously over the definite time period at the step S921, the processing is advanced to step S931. At the step S931, the opposite apparatus is notified that the scheduled load of the line is 8 Gbps.

If the scheduled load of the line is less than 8 Gbps at the step S920, the processing is advanced to step S930. At the step S930, it is judged whether the transmission load judgment result of the line is less than 6 Gbps. If the transmission load judgment result of the line is at least 6 Gbps, the processing is advanced to step S931. At the step S931, the opposite apparatus is notified that the scheduled load of the line is 8 Gbps.

If the line transmission load judgment result is less than 6 Gbps at the step S930, the processing is advanced to step S940. At the step S940, it is judged whether the scheduled load of the line is less than 6 Gbps. If the scheduled load of the line is at least 6 Gbps, the processing is advanced to step S941. At the step S941, it is judged whether the transmission load judgment result of the line has become less than 6 Gbps continuously over a definite time period. Unless the transmission load judgment result of the line has become less than 6 Gbps continuously over the definite time period, the processing is advanced to step S942. At the step S942, the scheduled load of the line is maintained.

If the transmission load judgment result of the line has become less than 6 Gbps continuously over the definite time period at the step S941, the processing is advanced to step S951. At the step S951, the opposite apparatus is notified that the scheduled load of the line is 6 Gbps.

If the scheduled load of the line is less than 6 Gbps at the step S940, the processing is advanced to step S950. At the step S950, it is judged whether the transmission load judgment result of the line is less than 4 Gbps. If the transmission load judgment result of the line is at least 4 Gbps, the processing is advanced to step S951. At the step S951, the opposite apparatus is notified that the scheduled load of the line is 6 Gbps.

If the transmission load judgment result of the line is less than 4 Gbps at the step S950, the processing is advanced to step S960. At the step S960, the opposite apparatus is notified that the scheduled load of the line is 4 Gbps.

Since the graph in FIG. 8 shows the variation of the network traffic obtained when the band control processing is not executed, the graph is regarded as the result of the transmission load judgment of the line.

Figure 10:
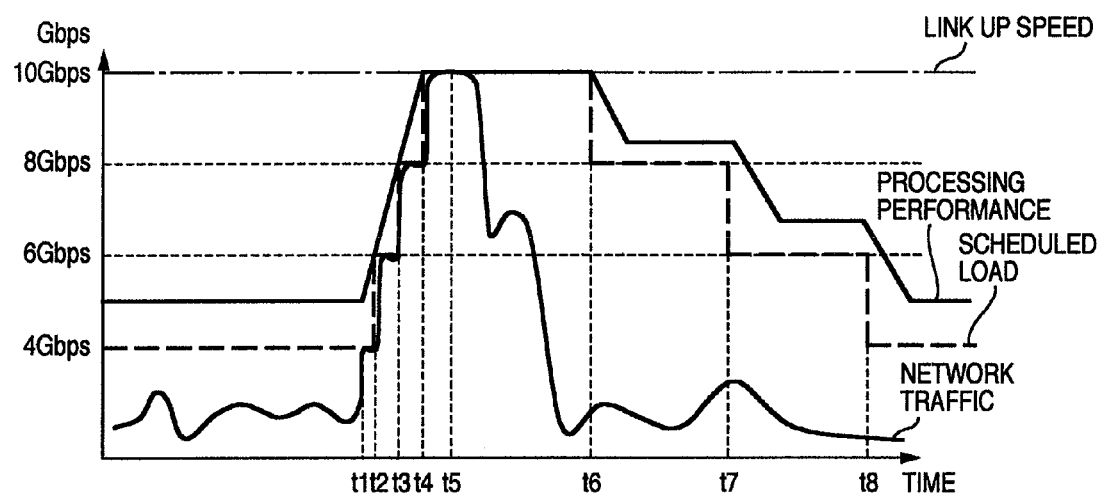
FIG. 10 is a network traffic variation graph (2) at the time when band control processing is executed.

FIG. 10 shows an example of a graph obtained after band control processing based on the scheduled load variation judgment processing is conducted on the network traffic shown in FIG. 8. The graph in FIG. 10 shows a variation of the network traffic, a variation of the scheduled load, a variation of the processing capability, and the link up speed obtained when the band control processing based on the scheduled load variation judgment processing is executed, in a time series form.

The ensuing description will be made with reference to FIGS. 8 and 10. In FIGS. 8 and 10, each of t1, t2, t3, t4, t5, t6, t7 and t8 indicates the same time.

In FIG. 8, the transmission load judgment result of the line is at least 4 Gbps and less than 6 Gbps and the scheduled load of the line is 4 Gbps at time t1. At time t2, therefore, the opposite apparatus is notified that the scheduled load of the line is 6 Gbps and the scheduled load in FIG. 10 is changed to 6 Gbps. However, the processing capability varies according to the notice of the scheduled load. When increasing the scheduled load, therefore, the network relay apparatus transmits the control information frame to the opposite apparatus to notify it of the scheduled load variation, waits for a time period (t2−t1) until the processing capability increases, and increases the scheduled load. By increasing the scheduled load of the network relay apparatus to 6 Gbps, band control processing is conducted so as to make the upper limit of network traffic directed from the network relay apparatus to the opposite apparatus equal to 6 Gbps.

In the present load judgment method, the scheduled load of the network relay apparatus may be increased after a response frame such as a control information frame for increasing the processing capability is received from the opposite apparatus after transmission of a control information frame.

Since the transmission load judgment result of the line is at least 8 Gbps at time t2 in FIG. 8, the opposite apparatus is notified that the scheduled load of the line is 10 Gbps. Thereafter, in the network relay apparatus, the scheduled load in FIG. 10 is changed to 8 Gbps at time t3 and the scheduled load in FIG. 10 is changed to 10 Gbps at time t4. In this way, the scheduled load is increased stepwise.

If the transmission load judgment result of the line in FIG. 8 is at least 6 Gbps and less than 8 Gbps at time t4, however, the scheduled load is maintained.

As a result, it is considered that frame discarding occurs in the graph shown in FIG. 10 neither in the network relay apparatus nor in the opposite apparatus.

The definite time period in FIG. 9 is denoted by Δt. In the ensuing description, the difference between the time t6 and the time t5, the difference between the time t7 and the time t6, and the difference between the time t8 and the time t7 is at least Δt.

In FIG. 8, the transmission load judgment result of the line is less than 8 Gbps continuously over a time period between the time t5 and the time t6, and the scheduled load of the line is 10 Gbps over the time period. At time t6, therefore, the scheduled load is changed to 8 Gbps. Furthermore, in FIG. 8, the transmission load judgment result of the line is less than 6 Gbps continuously over a time period between the time t6 and the time t7, and the scheduled load of the line is 8 Gbps over the time period. At time t7, therefore, the scheduled load is changed to 6 Gbps. Furthermore, in FIG. 8, the transmission load judgment result of the line is less than 8 Gbps continuously over a time period between the time t7 and the time t8, and the scheduled load of the line is 6 Gbps over the time period. At time t8, therefore, the scheduled load is changed to 4 Gbps.

When reducing the scheduled load, however, a control information frame is transmitted to the opposite apparatus to notify it of the scheduled load variation. At this time, it is not necessary to wait for the opposite apparatus to lower the processing capability. Therefore, reduction of the scheduled load may be conducted simultaneously with the notice of the scheduled load variation.

It is supposed that the processing capability is always at least the scheduled load in the graph shown in FIG. 10.

In the flow chart shown in FIG. 9, the scheduled load is set to one of four values: 4 Gbps, 6 Gbps, 8 Gbps and 10 Gbps. Alternatively, an arbitrary number of arbitrary values may be specified.

In the flow chart shown in FIG. 9, the scheduled load variation threshold is provided with the same values as those of the scheduled load. Alternatively, the scheduled load variation threshold may be provided with values different from those of the scheduled load.

In the flow chart shown in FIG. 9, the scheduled load variation threshold is provided with the same values regardless of whether the scheduled load variation is increasing or decreasing. Alternatively, the scheduled load variation threshold may be provided with different values depending on whether the scheduled load variation is increasing or decreasing.

In FIG. 10, the processing performance is changed in proportion to the time. However, this differs according to the control method of the processing performance.

In the operation of the LSI, there is a fear that the operation of the LSI might become unstable when the operation voltage has changed abruptly, resulting in a failure of the LSI in the worst case. The abrupt change of the operation voltage also occurs when the clock is changed abruptly. Therefore, the changeover of the clock or the operation voltage cannot be conducted abruptly.

When a small value which is small as compared with the processing performance of the line is set as the scheduled load of the line and then the scheduled load of the line is increased, therefore, the scheduled load of the line is increased stepwise while improving the processing performance. As a result, it becomes possible to suppress an abrupt change of the clock or the operation voltage in the present load judgment method.

According to (11) "delay control function," delay control processing for conducting transmission without generating a delay in arrival time becomes possible in communication such as IP telephone in which the delay in arrival time caused by the band control poses a problem.

According to (12) "discarding control function," discarding control processing for discarding low priority frames in order to protect high priority frames when burst transfer of network traffic has occurred in a network relay apparatus which does not have (10) "band control function" becomes possible.

A network relay apparatus having (10) "band control function" may be equipped with (12) "discarding control function." This is because there is a fear that frame discarding might occur even in a network relay apparatus having (10) "band control function" if burst transfer of extremely special network traffic such as a DDoS (Distributed Denial of Service) attack takes place.

Owing to the load judgment method heretofore described, it becomes possible for the opposite apparatus to judge a load on a reception line on the basis of a scheduled load given as a notice. For example, in the case of the search LSI 103 in item No. 1 shown in TABLE 1, it is indicated that the load of the ingress side down link block 202 can be judged on the basis of the ingress side load of the line. For example, in judging, in the opposite apparatus, the load of the ingress side down link block 202a shown in FIG. 2, therefore, it is possible to judge a scheduled load laid upon a line connected to the down link interface block 201a by using (5) "scheduled load judgment function" in the search LSI 103 as the load judgment function and judge a load of the ingress side down link block 202a on the basis of the scheduled load.

Reduction of the power consumption is implemented by changing over, in the frequency voltage control unit, at least one of the clock and operation voltage supplied to each of the function blocks on the basis of the load judgment result of each judged function block.

D. Load Judgment Method Based on Link Up State Judgment of the Line:

According to the present load judgment method, a load of the line is judged on the basis of a link up state of every line between network relay apparatuses and a load on a corresponding function block is judged on the basis of a result of the load judgment. In the present embodiment, the load judgment function indicates (6) "line load upper limit judgment function" in the search LSI 103.

As the link up state, there are link up and link down. In the link up, there is further a link up state of every line speed. In other words, if the line speed at the time of link up is changed over among 10 Mbps, 100 Mbps and 1,000 Mbps as in 1000BASE-T prescribed in IEEE802.3ab, each line speed becomes an upper limit of the line load.

In (6) "line load upper limit judgment function," the upper limit of the line load is judged on the basis of the link up state of the line given as a notice by the central control unit 102. The link up state given as a notice includes information which represents whether each line is linked up and a line speed in the case where the line is linked up. In (6) "line load upper limit judgment function," therefore, a line load can be judged on the basis of a line speed of a line linked up among a plurality of lines. In (6) "line load upper limit judgment function," therefore, the line load can be judged on the basis of a line speed of a line linked up among a plurality of lines. For example, in the case of the search LSI 103 in item No. 1 shown in TABLE 1, it is indicated that the load of the ingress side down link block 202 can be judged on the basis of the ingress side load of the channel (line). For example, in judging the load of the ingress side down link block 202*a* shown in FIG. 2, therefore, (6) "line load upper limit judgment function" in the search LSI 103 is used as the load judgment function and the line load based on the line speed is judged on the basis of a link up state of a line connected to the down link interface block 201*a*. On the basis of a result of the judgment, the load of the ingress side down link block 202 can be judged.

For example, in the case of the search LSI 103 in item No. 3 shown in TABLE 1, it is indicated that the load of the search memory access block 207 can be judged on the basis of the total load on all channels in the LSI. For example, in judging the load of the search memory access block 207 shown in FIG. 2, therefore, (6) "line load upper limit judgment function" in the search LSI 103 is used as the load judgment function and a total value of line loads corresponding to line speeds of lines linked up is judged. On the basis of a result of the judgment, the load of the search memory access block 207 can be judged.

Reduction of the power consumption is implemented by changing over, in the frequency voltage control unit, at least one of the clock and operation voltage supplied to each of the function blocks on the basis of the load judgment result of each judged function block.

E. Load Judgment Method Based on Load Information Exchange between Network LSIs:

According to the present load judgment method, a load for a corresponding network LSI is judged on the basis of load information of a network LSI in a preceding stage by exchanging load information between network LSIs. In the present embodiment, the load judgment function indicates a combination of at least one of (18) "load prediction and judgment function" in the switch LSI 105, (15) "load prediction and judgment function" in the transfer LSI 104, and (7) "load prediction and judgment function" in the search LSI 103.

Paying attention to the load of the ingress side down link block 302 in the transfer LSI 104 in item No. 1 shown in TABLE 1, it is indicated that the load is judged on the basis of the ingress side load of the channel. Therefore, loads of all lines measured by the ingress side line load measurement blocks 222*a* to 222*d* in the search LSI 103 are caused to be given as a notice by using (15) "load prediction and judgment function" in the transfer LSI 104 as the load judgment function. As a result, the load of the ingress side down link block 302 in the transfer LSI 104 connected to the search LSI 103 can be judged on the basis of the total of the loads of all lines. Furthermore, it is also possible to judge the total load of the four switch LSIs 105 on the basis of the total of loads of the ingress side down link blocks 302 in all transfer LSIs 104*a* to 104*d*.

Loads of the egress side down link blocks 203 in each search LSI 103 (in a column of item No. 2 and search LSI 103 shown in TABLE 1), the egress side up link blocks in each search LSI 103 (in a column of item No. 5 and search LSI 103 shown in TABLE 1), and the egress side down link blocks 303 (in a column of item No. 2 and transfer LSI 104 shown in TABLE 1) can be judged by causing the ingress side load measurement block 224 in every search LSI 103 to measure the line load of every frame transfer destination port and causing the total of load measurement results of every frame transfer destination port in all search LSIs 103 included in the network relay apparatus to be given as a notice by using (7) "load prediction and judgment function" in each search LSI 103 and (15) "load prediction and judgment function" in each transfer LSI 104.

Reduction of the power consumption is implemented by changing over, in the frequency voltage control unit, at least one of the clock and operation voltage supplied to each of the function blocks on the basis of the load judgment result of each judged function block.

F. Load Judgment Method Based on Specific Function Operation State Judgment:

According to the present load judgment method, the central control unit 102 judges a function which is not used and which is included in functions in the network LSI on the basis of the operation state of the network relay apparatus, and judges the load of the pertinent function block. In the present embodiment, the load judgment function indicates a combination of at least one of (19) "function control load judgment function" in the switch LSI 105, (16) "function control load judgment function" in the transfer LSI 104, and (8) "function control load judgment function" in the search LSI 103.

In other words, the central control unit 102 judges functions which are included in the statistical function, QoS control function, and various power consumption reducing functions and which are not used, and judges the load of each function block. They are exemplified in item No. 11 in TABLE 1.

Reduction of the power consumption is implemented by changing over, in the frequency voltage control unit, at least one of the clock and operation voltage supplied to each of the function blocks on the basis of the load judgment result of each judged function block.

G. Load Judgment Method Based on the Scheduled Load Information Notice of the Management Server:

In the present load judgment method, the central processing unit 102 receives a notice of scheduled load information which indicates a scheduled load for each of one or more lines included in the network relay apparatus, from a management server located inside or outside the network relay apparatus, and judges a scheduled load of each line or a load of each function block on the basis of the scheduled load information. In the present embodiment, the load judgment function indicates a combination of at least one of (7) "load prediction and judgment function" in the search LSI 103, (1) "frame analysis function" in the search LSI 103, (15) "load prediction and judgment function" in the transfer LSI 104, (18) "load prediction and judgment function" in the switch LSI 105, and (20) "scheduled load adjustment function." By the way, it is desirable to transfer scheduled load information in the present load judgment method in a packet form so as to be able to give a notice even to a network relay apparatus located at a physical distance via another network relay apparatus.

Figure 11:
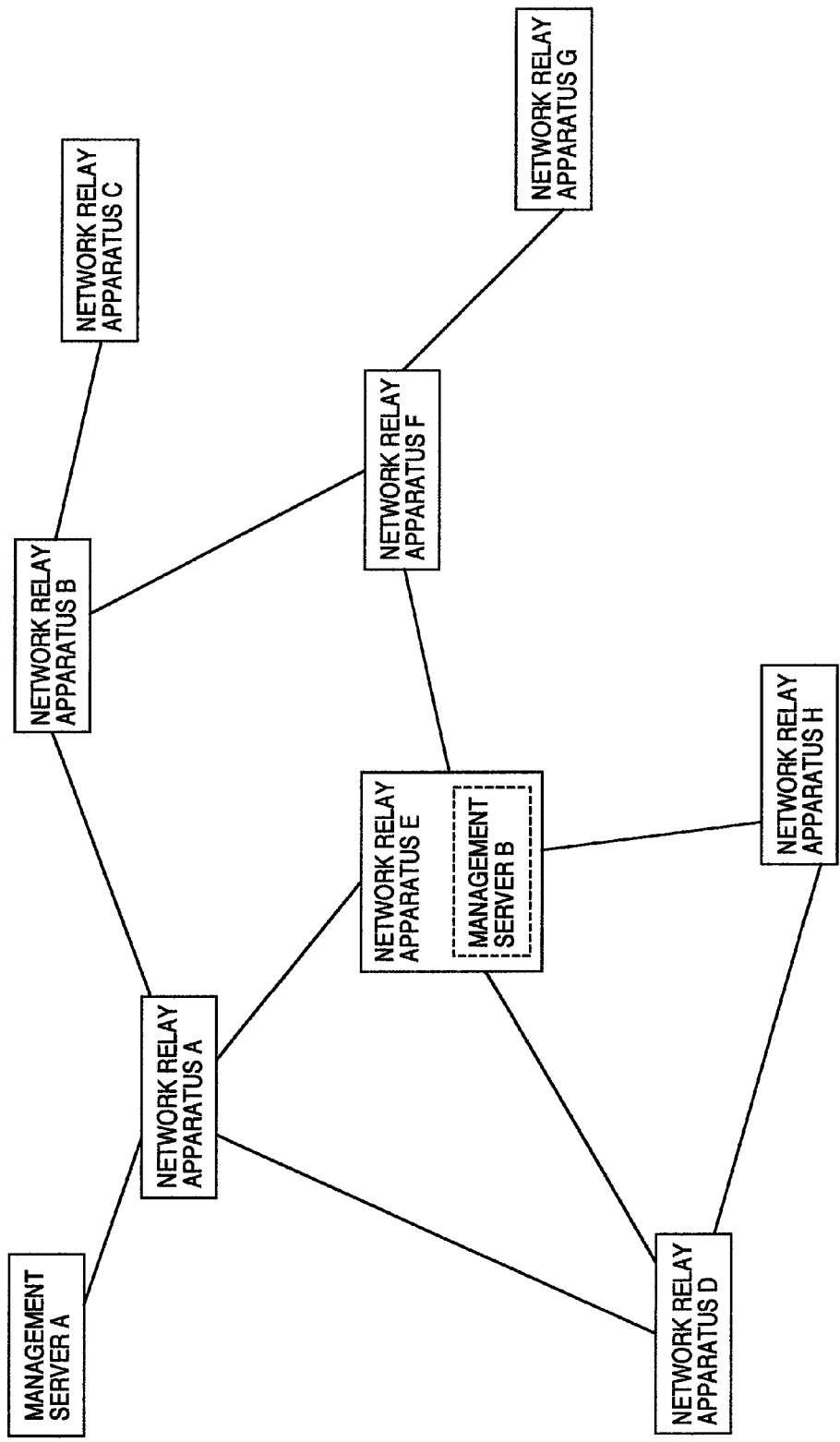
FIG. 11 is a diagram showing a subnetwork which includes network relay apparatuses and management servers.

FIG. 11 is a diagram showing a subnetwork which includes network relay apparatuses A to H and management servers A and B. The network relay apparatuses A to H are also connected to other network relay apparatuses and servers which are not illustrated. In the present embodiment, the management server A gives notice of scheduled load information to the network relay apparatuses A to E and the management server B in the network relay apparatus E gives notice of the scheduled load information to the network relay apparatuses F to H. The scheduled load information includes a scheduled transmission load and a scheduled reception load. However, only one of them may be given as a notice. The scheduled reception load may be judged by giving only the scheduled transmission load and exchanging scheduled loads between network relay apparatuses in the same way as "C. load judgment method based on scheduled load exchange between network relay apparatuses."

Upon receiving a control information packet which stores scheduled load information of each line from the management server A or B, the network relay apparatus A-H transfers the control information packet to the central control unit 102. The central control unit 102 analyzes the control information packet, extracts scheduled load information, and judges the scheduled load of each line. Furthermore, the central control unit 102 judges the load of each function block in each network LSI on the basis of the scheduled load of each line, and gives notice to at least one of the load information transmission block 229 in the search LSI 103, the load information transmission block 316 in the transfer LSI 104, and the load information transmission block 416 in the switch LSI 105.

An example of judgment on a load of a function block will now be described. For example, in the case of the search LSI 103 in item No. 1 shown in TABLE 1, the load of the ingress side down link block 202 can be judged on the basis of the ingress side load of a channel (line). Therefore, the load of the ingress side down link block 202 can be judged on the basis of a scheduled reception load extracted from scheduled load information.

It is also possible that the central control unit 102 transmits the scheduled load of each line to each network LSI and the load judgment control block in each network LSI judges the load of each function block. Furthermore, it is also possible for the frame analysis block 223 in the search LSI 103 to execute as proxy a part or the whole of the processing conducted in the central control unit 102 by analyzing a control information packet transmitted from the management server, executing scheduled load information, and giving notice to other network LSIs.

In the present embodiment, each of the management servers A and B judges optimum performance with which the network relay apparatus should operate (for example, the reception line load or the transmission line load with which operation should be guaranteed), and gives notice of the optimum performance to the network relay apparatuses A to H as scheduled load information which indicates the scheduled load of each line. The optimum performance judgment method includes at least one of a judgment method based on the load measurement result in the network relay apparatus, a judgment method using prediction based on statistical data or frequency analysis, a judgment method for judging optimum performance by setting a time zone in which traffic already known in network management decreases or increases, and a judgment method based on contents preset in the management server as a schedule by describing a schedule of events which can be predicted beforehand and which are included in events considered to vary the network traffic such as the World Cup of soccer or the Olympics on an event calendar. The management server need only give notice of scheduled load information to each network relay apparatus on the basis of optimum performance obtained by the judgment, and the judgment method of the optimum performance in the management server does not especially matter. As regards events which cannot be predicted beforehand among events, such as disasters, incidents and accidents, considered to take place suddenly and vary the network traffic, scheduled load information may be given to each network relay apparatus as a notice by a program in the management server or operation of the manager.

Figure 12:
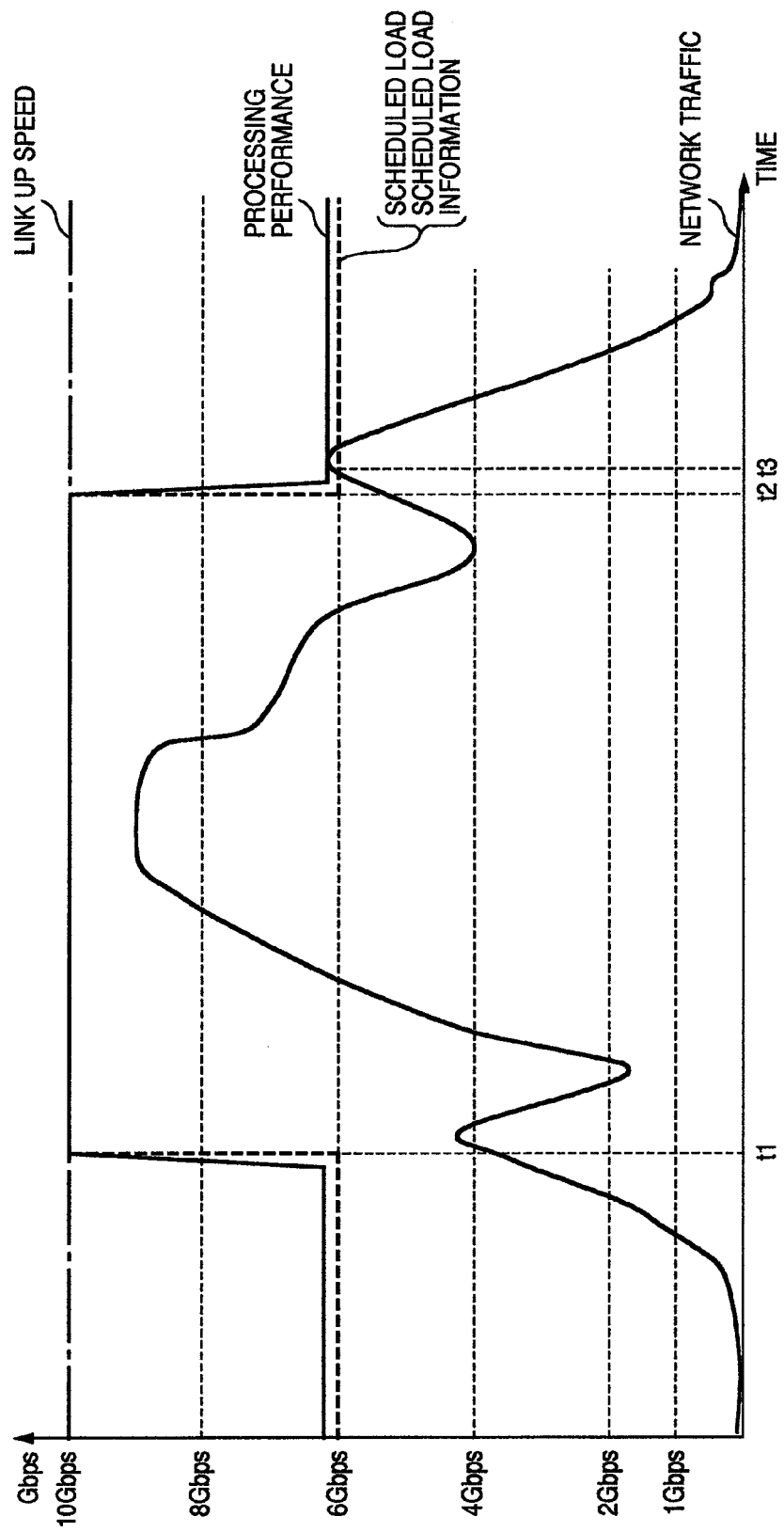
FIG. 12 is a graph (1) obtained when the scheduled load is judged on the basis of scheduled load information given as a notice by a management server and processing performance is changed.

FIG. 12 is a graph obtained when the scheduled load is judged on the basis of scheduled load information given as a notice by the management server and processing performance is changed. The variation of the network traffic obtained when the band control is not executed, the link up speed, processing performance, scheduled load, and scheduled load information are shown in a time series form. The link up speed of the line is 10 Gbps. In the present embodiment, the management server gives notice of scheduled load information of 10 Gbps in a time period between time t1 and time t2, and gives notice of scheduled load information of 6 Gbps at time which does not belong to the time period. This is the case where the optimum performance is set in the management server so as to reduce the scheduled load information at specific time (time other than the time period between the time t1 and the time t2) with the object of reducing the power consumption quantity at specific time when the traffic reduction can be anticipated. In the present embodiment, a judgment is made by using scheduled load information given as a notice by the management server, intact as the scheduled load of the line. As a result, power consumption quantity reduction at specific time can be implemented on the pertinent line.

In the graph shown in FIG. 12, a load which exceeds the scheduled load occurs at time t3. In order to cope with such a case, it becomes possible for a network relay apparatus which transmits network traffic shown in FIG. 12 to transmit network traffic in the range of the scheduled load by further combining at least one of (10) band control function, (11) delay control function, and (12) discarding control function.

At specific time (time other than the time period between the time t1 and the time t2) in FIG. 12, the processing performance according to the scheduled load need only be ensured and consequently the power consumption quantity can be reduced by judging the load of a function block in each network LSI on the basis of the scheduled load. Heretofore, seven load judgment methods A to G have been described. It is also possible to obtain a greater effect by not only using each load judgment function singly but also using load judgment functions in combination.

If at least one of "B. load judgment method based on operation state judgment of the line," "D. load judgment method based on link up state judgment of the line," "E. load judgment method based on load information exchange between network LSIs" and "G. load judgment method based on the scheduled load information notice of the management server" is combined with "C. load judgment method based on scheduled load exchange between network relay apparatuses," the precision of the load judgment result used in the control information generation block 226 in the search LSI 103 is considered to be improved.

FIG. 13 is a graph obtained when a combination of the functions (10) to (12), "C. load judgment method based on scheduled load exchange between network relay apparatuses" and "G. load judgment method based on the scheduled load information notice of the management server" is applied to the network traffic shown in FIG. 12. The graph in FIG. 13 shows a variation of network traffic obtained when band control processing based on the scheduled load variation judgment processing is executed, a variation of the scheduled load, a variation of processing capability, the link up speed, a variation of scheduled load information (upper limit) and a variation of scheduled load information (lower limit) in a time series form. In the present embodiment, two kinds of scheduled load information are shown. However, there is no limit in the number of kinds of scheduled load information. As for scheduled load variation judgment processing, the scheduled load and scheduled load variation threshold are varied by taking 2 Gbps as the unit in the example shown in FIGS. 9 and 10. In the present embodiment, however, the scheduled load and scheduled load variation threshold are varied by using a smaller unit.

Hereafter, FIG. 13 will be described. In the present embodiment, the management server gives notice of scheduled load information (upper limit) of 10 Gbps in a time period between time t1 and time t4, and gives notice of scheduled load information (upper limit) of 6 Gbps at time which does not belong to the time period between time t1 and time t4. In the same way, the management server gives notice of scheduled load information (lower limit) of 4 Gbps in a time period between time t2 and time t3, and gives notice of scheduled load information (lower limit) of 1 Gbps at time which does not belong to the time period between time t2 and time t3. In the present embodiment, the upper limit value and the lower limit value at the time of scheduled load variation are determined on the basis of a plurality of kinds of scheduled load information. At time t2, therefore, the scheduled load rises regardless of the load of the network traffic. At time t5, the scheduled load indicates a scheduled load value which is equal to the scheduled load information (upper limit) without following an increase of the network traffic. At time t6, the scheduled load indicates a scheduled load value which is equal to the scheduled load information (lower limit) without following a decrease of the network traffic. Such control can be exercised by, for example, judging whether a scheduled load to be given as a notice is in a range between the upper limit value and the lower limit value, and giving notice of the upper limit value as the scheduled load if the scheduled load exceeds the upper limit value or giving notice of the lower limit value as the scheduled load if the scheduled load is less than the lower limit value at steps (S911, S931, S951 and S960) of giving notice of scheduled load in FIG. 9. It becomes possible to reduce the power consumption in a time zone in which the network traffic is low by providing an upper limit value of the scheduled load. In addition, it becomes possible to ensure the network traffic at the lowest limit by providing a lower limit value of the scheduled load. In the network relay apparatus, the load of each function block in each network LSI is judged on the basis of the scheduled load because processing performance based on the scheduled load should be ensured.

In the network relay apparatus which transmits the network traffic at the time t5, it becomes possible to transmit the network traffic within the range of the scheduled load by combining at least one of (10) band control function, (11) delay control function, and (12) discarding control function and bringing the combination into effect. The decrease of reliability can be minimized in the network relay apparatus in the low power consumption state.

In the present invention, the load of each channel (line) in each network LSI and the load of a function block which implements a specific function can be judged on the basis of results of load judgment using these load judgment methods. Furthermore, loads of function blocks in each network LSI can be judged on the basis of the load of each channel (line), loads of function blocks which implement specific functions, and loads of specific function blocks at the time of maximum performance operation.

Loads of function blocks are classified into loads judged on the basis of the ingress side load of the channel, loads judged on the basis of the egress side load of the channel, loads judged on the basis of the total load of all channels in the LSI, loads judged on the basis of the total ingress side load of all channels in the LSI, loads judged on the basis of the total egress side load of all channels in the LSI, loads judged on the basis of the maximum value of ingress side loads of all channels in the LSI, loads judged on the basis of the maximum value of egress side loads of all channels in the LSI, loads judged supposing that the load is always maximum, loads judged supposing that the ingress side load is always maximum, loads judged supposing that the load is always maximum, loads judged supposing that the egress side load is always maximum, and loads judged on the basis of the use state of the function. TABLE 1 shows classification of function blocks in each network LSI.

TABLE 1

| | | Search LSI 103 | Transfer LSI 104 | Switch LSI 105 |
|---|---|---|---|---|
| 1 | Loads judged on the basis of ingress side load of channel | Ingress side down link block 202 | Ingress side down link block 302, Ingress side up link block 307 | Ingress side data channel block 402, R side control channel block 406 |
| 2 | Loads judged on the basis of egress side load of channel | Egress side down link block 203 | Egress side down link block 303, Egress side up link block 308 | Egress side data channel block 404, T side control channel block 408 |
| 3 | Loads judged on the basis of total load of all channels in LSI | Search memory access block 207, Buffer memory access block 212, Data processing block 219 | Data processing block 311 | Data processing block 411 |
| 4 | Loads judged on the basis of total ingress side load of all channels in LSI | Ingress side up link block 217 | | |
| 5 | Loads judged on the basis of total egress side load of all channels in LSI | Egress side up link block 218 | | |
| 6 | loads judged on the basis of maximum value of ingress side loads of all channels in LSI | Ingress side line collection block 204 | Ingress side down link collection block 304, Ingress side up link collection block 309 | Ingress side channel collection block 409 |

TABLE 1-continued

| | Search LSI 103 | Transfer LSI 104 | Switch LSI 105 |
|---|---|---|---|
| 7 Loads judged on the basis of maximum value of egress side loads of all channels in LSI | Egress side line collection block 205 | Egress side down link collection block 305, Egress side up link collection block 310 | Egress side channel collection block 410 |
| 8 Loads judged supposing that load is always maximum | Down link I/F block 201, Search memory I/F block 206, Buffer memory I/F block 211, Up link I/F block 216, Frequency voltage control block 228 | Down link I/F block 301, Up link I/F block 306, Frequency voltage control block 315 | Frequency voltage control block 415 |
| 9 Loads judged supposing that ingress side load is always maximum | | | Ingress side I/F block 401, R side control I/F block 405 |
| 10 Loads judged supposing that egress side load is always maximum | | | Egress side I/F block 403, T side control I/F block 407 |
| 11 Loads judged on the basis of use state of function | QoS control function block 220, Statistical function block 221, Ingress side line load measurement block 222, Frame analysis block 223, Ingress side load measurement block 224, Egress side load measurement block 225, Control information generation block 226, Frame transmission control block 227, Load information transmission block 229, Load judgment control block 230 | Statistical function block 312, Ingress side load measurement block 313, Egress side load measurement block 314, Load information transmission block 316, Load judgment control block 317 | Statistical function block 412, Data load measurement block 413, Control load measurement block 414, Load information transmission block 416, Load judgment control block 417 |

It is appreciated that the load judgment control block in each network LSI can judge loads of all function blocks by thus conducting the classification. The frequency voltage control block 228 in the search LSI 103, the frequency voltage control block 315 in the transfer LSI 104 and the frequency voltage control block 415 in the switch LSI 105 control at least one of the clock and the operation voltage every function block in each LSI on the basis of the result of the load judgment. As a result, power consumption can be reduced.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A first communication apparatus comprising:
a plurality of LSIs, each LSI including a plurality of function blocks to conduct data transfer via a line, each function block implementing at least one of a transmission process for transmitting a frame from the line, a statistical process, and a Quality of Service (QoS) control process;
a load determination unit which determines a load of at least two of the function blocks included in the LSI; and
a power control unit which controls power for at least two of the function blocks included in the LSI depending on the determined load of the function block.

2. The first communication apparatus according to claim 1, further comprising:
a receiver unit which receives a control frame from a second communication apparatus,
wherein the load determination unit analyzes the received control frame to determine a load of the function block.

3. The first communication apparatus according to claim 1, wherein the power control unit supplies an operation voltage to the function block to control the power.

4. The first communication apparatus according to claim 1, further comprising:
a receiver unit which receives a control frame from a second communication apparatus,
wherein the control frame is a first control frame indicating whether the line carrying the control frame is a standby system line or an operational system line, and
wherein the load determination unit determines the load of the function block based on whether the line is the standby system line or the operational system line.

5. The first communication apparatus according to claim 1, further comprising:
a receiver unit which receives a control frame from a second communication apparatus,
wherein the control frame is a second control frame which stores information on scheduled load of transmission traffic that a control relay apparatus transmits, and
wherein the load determination unit determines the load of the function block based on the information on the scheduled load.

6. The first communication apparatus according to claim 1, wherein the plurality of LSIs includes at least two LSIs among search LSIs to determine a frame transfer destination port for a frame from a network based on header information of the frame, a switch LSI to transfer the frame toward the frame transfer destination port, and a transfer LSI to select a switch LSI to transfer the frame.

7. The first communication apparatus according to claim 6, further comprising:
a control unit coupled to at least one of the plurality of LSIs, wherein the control unit includes the load determination unit and the power control unit to supply power of the plurality of function blocks in each LSI.

8. The first communication apparatus according to claim 6, further comprising:
a control unit coupled to at least one of the plurality of LSIs, wherein the control unit includes the load determination unit and at least one of the plurality of LSIs includes the power control unit in at least one of LSIs.

9. The first communication apparatus according to claim 8, wherein the control unit monitors an operation state of the first communication apparatus, and the load determination unit determines a load of function block which is related to the monitored operation state.

10. The first communication apparatus according to claim 6, wherein the control unit monitors a link up state including information as to whether each line is linked up, and
wherein the load determination unit determines a load of a corresponding function block based on the monitored link up state.

11. The first communication apparatus according to claim 10,
wherein the plurality of LSIs further comprise a load information transmission unit for exchanging the link up state or load information of the function block determined based on the link up state with other LSIs, and
wherein the load determination unit determines a load of a function block in a specific LSI based on the link up states or the load information concerning a plurality of lines exchanged by the load information transmission unit.

12. The first communication apparatus according to claim 1,
wherein the plurality of LSIs includes a search LSI to determine a frame transfer destination port for a frame from a network based on header information of the frame, a switch LSI to transfer the frame toward the frame transfer destination port, and a transfer LSI to select a switch LSI to transfer the frame, and
wherein the transfer LSI comprises an ingress side load measurement unit and an egress side load measurement unit, and the load determination unit determines a load of a corresponding function block based on a load measured by at least one of the ingress side load measurement unit and the egress side load measurement unit.

13. A communication apparatus coupled to a network comprising:
a first network LSI configured to determine a frame transfer destination port for a frame from a network based on header information of the frame and configured to include a plurality of function blocks to conduct data transfer via a line, the function block implementing at least one of a transmission process for transmitting a frame from the line, a statistical process, and a Quality of Service (QoS) control process;
a second network LSI configured to transfer the frame toward the frame transfer destination port, and configured to include a plurality of function blocks to conduct data transfer via a line, the function block implementing at least one of a transmission process for transmitting a frame from the line and a statistical process;
a third LSI to select a switch LSI to transfer the frame, and configured to include a plurality of function blocks to conduct data transfer via a line, the function block implementing at least one of a transmission process for a frame from the line and a statistical process;
a load determination unit which determines a load of the function blocks included in at least one of the first LSI, the second LSI and the third LSI; and
a power control unit which controls power for the plurality of the function blocks included in at least one of the first LSI, the second LSI and the third LSI depending on the determined load of the function block.

* * * * *